United States Patent
Nagura et al.

(10) Patent No.: US 10,810,807 B2
(45) Date of Patent: Oct. 20, 2020

(54) DATA COLLECTION SYSTEM AND DATA CENTER

(71) Applicant: DENSO CORPORATION, Kariya, Aichi-pref. (JP)

(72) Inventors: Toru Nagura, Kariya (JP); Tsuneo Nakata, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 39 days.

(21) Appl. No.: 16/107,633

(22) Filed: Aug. 21, 2018

(65) Prior Publication Data

US 2019/0066403 A1   Feb. 28, 2019

(30) Foreign Application Priority Data

Aug. 23, 2017 (JP) ................. 2017-160362

(51) Int. Cl.
  *G07C 5/00* (2006.01)
  *G08G 1/01* (2006.01)
  *H04W 4/44* (2018.01)
  *H04W 4/46* (2018.01)
  *G07C 5/08* (2006.01)

(52) U.S. Cl.
  CPC ............ *G07C 5/008* (2013.01); *G07C 5/085* (2013.01); *G08G 1/0112* (2013.01); *H04W 4/44* (2018.02); *H04W 4/46* (2018.02)

(58) Field of Classification Search
  CPC ......... G07C 5/008; G07C 5/085; H04W 4/46; H04W 4/44; G08G 1/0112
  See application file for complete search history.

(56) References Cited

U.S. PATENT DOCUMENTS

| | | | | |
|---|---|---|---|---|
| 2007/0260363 A1* | 11/2007 | Miller | .................... | G07C 5/008 701/2 |
| 2009/0254248 A1* | 10/2009 | Park | ....................... | G08G 1/205 701/36 |

(Continued)

FOREIGN PATENT DOCUMENTS

JP    2016-132368 A    7/2016

*Primary Examiner* — Navid Ziaeianmehdizadeh
*Assistant Examiner* — Sean P Quinn
(74) *Attorney, Agent, or Firm* — Maschoff Brennan

(57) ABSTRACT

A data collection system includes: a communication terminal in each vehicle having a storage processor storing specific sensing information in a storage device and a vehicle-side communication unit; and a data center including a data center-side communication unit and a data center-side storage. The vehicle-side communication unit sequentially transmits vehicle information including a vehicle position to the data center. The data center-side communication unit transmits a transmission request of object information as the specific sensing information to an object vehicle, which is one of the vehicles approximately at a traveling position specified based on the vehicle position. The vehicle-side communication unit transmits the object information to the data center. When the data center-side communication unit receives the object information from a part of object vehicles, the data center-side communication unit transmits a deletion request for requesting to delete the object information to a remaining part of the object vehicles.

10 Claims, 13 Drawing Sheets

(56) References Cited

U.S. PATENT DOCUMENTS

| | | | | |
|---|---|---|---|---|
| 2010/0161172 A1* | 6/2010 | Bjelkstal | ............... | G07C 5/008 |
| | | | | 701/31.4 |
| 2010/0332072 A1* | 12/2010 | Ishiko | ................ | B60T 17/221 |
| | | | | 701/29.5 |
| 2013/0110344 A1* | 5/2013 | Merg | .................... | G07C 5/008 |
| | | | | 701/31.4 |
| 2014/0139354 A1* | 5/2014 | Miyazaki | ................ | H04W 4/46 |
| | | | | 340/902 |
| 2014/0195105 A1* | 7/2014 | Lambert | ................ | G07C 5/08 |
| | | | | 701/33.4 |
| 2016/0080279 A1* | 3/2016 | Tan | ........................ | H04L 47/32 |
| | | | | 370/328 |
| 2017/0149901 A1* | 5/2017 | Condeixa | .............. | H04L 67/18 |
| 2017/0330391 A1* | 11/2017 | Uno | ...................... | G07C 5/008 |

* cited by examiner

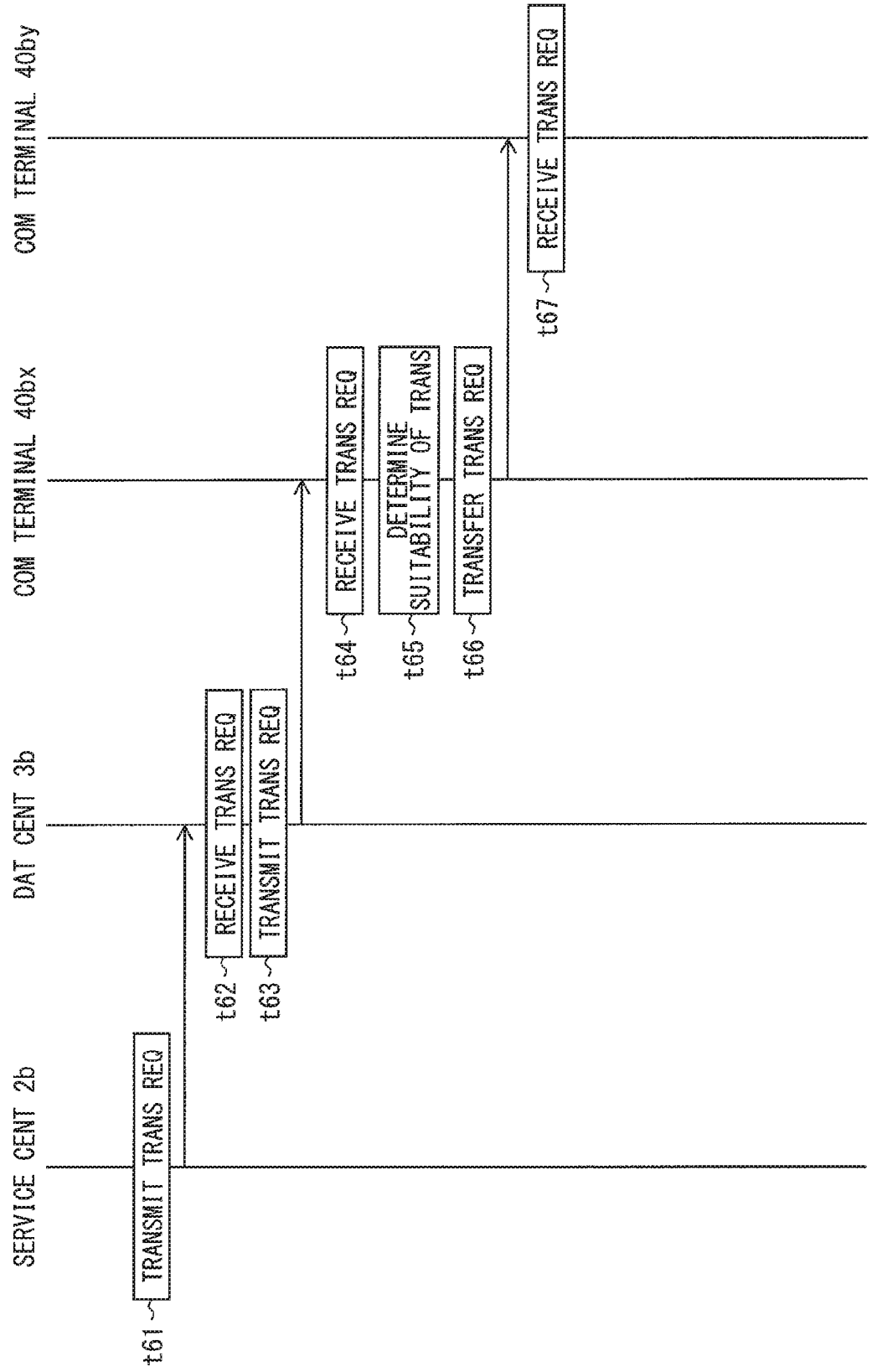

DATA COLLECTION SYSTEM AND DATA CENTER

CROSS REFERENCE TO RELATED APPLICATION

This application is based on Japanese Patent Application No. 2017460362 filed on Aug. 23, 2017, the disclosure of which is incorporated herein by reference.

TECHNICAL FIELD

The present disclosure relates to a data collection system and a data center for collection of vehicle data from plural vehicles.

BACKGROUND

Conventionally, a technique of collecting vehicle data from plural vehicles has been known. For example, Patent Literature 1 discloses a technique of designating type or the like of vehicle data as a collection object from a center, and obtaining vehicle data collected based on the designation.

However, sensing information, which is obtained with a sensor of an object vehicle at a specific time point, and which is not necessarily obtained with the center from all the object vehicles, may be obtained with the center from a part of the object vehicles traveling in approximate positions at that time point. Accordingly, when all the object vehicles transmit the sensing information to the center, the communication cost is wasteful. Further, when the center obtains the sensing information but the sensing information is kept in all the object vehicles, the capacity is wasted in the respective storage devices.

[Patent Literature 1] JP 2016-132368A

SUMMARY

It is an object of the present disclosure to provide a data collection system and a data center for suppressing the waste of the communication cost upon collection of sensing information and the waste of the capacity of the storage device.

According to a first aspect of the present disclosure, a data collection system includes: a communication terminal in each of a plurality of vehicles; and a data center that communicates with each communication terminal. Each communication terminal includes: a storage processor that stores specific sensing information, which is sequentially obtained from a sensor of a respective vehicle that mounts the communication terminal, in a storage device of the vehicle for a predetermined time period; and a vehicle-side communication unit that communicates with the data center. The data center includes: a data center-side communication unit that communicates with each communication terminal; and a data center-side storage that stores information. The vehicle-side communication unit sequentially transmits vehicle information, which includes a vehicle position of the vehicle and is different from the specific sensing information, to the data center. The data center-side communication unit transmits a transmission request for requesting to transmit object information, which is the specific sensing information corresponding to a specific time point, to the communication terminal mounted in an object vehicle, which is one of the vehicles disposed approximately at a traveling position at the specific time point. The traveling position at the specific time point is specified based on the vehicle position in the vehicle information. The vehicle-side communication unit transmits the object information stored in the storage device to the data center when the communication terminal receives the transmission request. When the data center-side communication unit receives the object information transmitted from the communication terminal in a part of object vehicles, and the data center-side storage stores the object information, the data center-side communication unit in the data center transmits a deletion request for requesting to delete the object information stored in the storage device to the communication terminal in a remaining part of the object vehicles. The storage processor in the remaining part of the object vehicles deletes the object information stored in the storage device when the communication terminal receives the deletion request.

According to the above data collection system, the data center-side communication unit transmits a transmission request for transmission of the object information as the specific sensing information corresponding to a specific time point, to a communication terminal used in an object vehicle in an approximate traveling position at the specific time point. There is a high possibility that vehicles in traveling positions approximate to each other at a specific time point hold, in their storage devices, specific sensing information approximate to each other as object information corresponding to that time point. Accordingly, even when object information transmitted from the communication terminal in a part of the object vehicles is received and stored in the center-side storage, it is possible to collect object information corresponding to that time point. Further, when the data center-side communication unit receives the object information transmitted from the communication terminal in the part of the object vehicles and stores the received object information in the data center-side storage, the data center-side communication unit transmits a deletion request for deletion of the object information stored in the storage device to the communication terminal in the remaining object vehicles. Accordingly, it is possible to avoid the situation where the approximate specific sensing information is kept in the storage device of all the object vehicles. Further, in the communication terminal which has received the deletion request before transmission of the object information to the data center, as the object information stored in the storage device is deleted, the object information is not transmitted to the data center. Accordingly, it is possible to suppress the waste of the communication cost by further transmitting object information approximate to the already-obtained object information to the data center which has already obtained the object information. As a result, it is possible to suppress the waste of the communication cost upon collection of sensing information and the waste of the capacity of the storage device.

According to a second aspect of the present disclosure, a data collection system includes: a communication terminal in each of a plurality of vehicles; and a data center that communicates with each communication terminal. Each communication terminal includes: a storage processor that stores specific sensing information, which is sequentially obtained from a sensor of the vehicle that mounts the communication terminal, in a storage device of the vehicle for a predetermined time period; and a vehicle-side communication unit that communicates with the data center. The data center includes a data center-side communication unit that communicates with each communication terminal. The vehicle-side communication unit sequentially transmits vehicle information, which includes at least one of a status of the communication terminal and a status of the vehicle mounting the communication terminal, to the data center.

The vehicle information is different from the specific sensing information. The data center-side communication unit transmits a storage request for requesting to store the specific sensing information to the communication terminal. When the vehicle-side communication unit of the communication terminal receives the storage request, the storage processor stores the specific sensing information sequentially obtained from the sensor in the storage device for the predetermined time period. The data center-side communication unit restricts a transmission destination of the storage request to the communication terminal which satisfies a predetermined condition specified based on the vehicle information. The vehicle-side communication unit transmits the specific sensing information stored in the storage device to the data center.

According to the above data collection system, the data center-side communication unit transmits a storage request limitedly to communication terminals which satisfy a predetermined condition. Accordingly, it is possible to narrow communication terminals to store specific sensing information in the storage device in accordance with the predetermined condition. Accordingly, in comparison with a case where the communication terminals to store the specific sensing information in the storage device are not narrowed in accordance with the predetermined condition, it is possible to suppress the waste of the capacity of the storage devices. Further, as the vehicle-side communication unit transmits the specific sensing information stored in the storage device to the data center, the communication terminal which has not received the storage request does not transmit the specific sensing information to the data center. Accordingly, in comparison with a case where the communication terminals to store the specific sensing information in the storage device are not narrowed in accordance with the predetermined condition, it is possible to suppress the waste of the communication cost to transmit the specific sensing information to the data center. Further, the predetermined condition is specified based on the vehicle information including any one of statuses of the communication terminal and the vehicle using the communication terminal. Accordingly, it is possible to narrow the communication terminals to store the specific sensing information in the storage device to communication terminals in which the waste of the communication cost is suppressed. As a result, it is possible to suppress the waste of the communication cost upon collection of sensing information and the waste of the capacity of the storage devices.

According to a third aspect of the present disclosure, a data collection system includes: a communication terminal in each of a plurality of vehicles; and a data center that communicates with each communication terminal. The data center includes a data center-side communication unit that communicates with the communication terminal. Each communication terminal includes: a storage processor that stores specific sensing information, which is sequentially obtained from a sensor of the vehicle that mounts the communication terminal, in a storage device of the vehicle for a predetermined time period; a vehicle-side communication unit that communicates with the data center; and an inter-vehicle communication unit that communicates with another communication terminal other than the communication terminal. The vehicle-side communication unit transmits object information, which is the specific sensing information corresponding to a current time point and stored in the storage device, to the data center. When the vehicle-side communication unit completes to transmit the object information, the inter-vehicle communication unit transmits a notification, for requesting not to transmit the object information to the data center and not to store the object information in the storage device of a peripheral communication terminal, to the peripheral communication terminal communicable with the communication terminal.

According to the above data collection system, upon completion of the transmission of the object information as the specific sensing information corresponding to a current time point, stored in the storage device, from the vehicle-side communication unit to the data center, the inter-vehicle communication unit transmits a notification, not to transmit the object information to the data center and not to store the object information with the peripheral communication terminals communicable with the own terminal, to the peripheral communication terminals. The peripheral communication terminals communicable with the own terminal are used in the peripheral vehicles in a traveling position at a current time point approximate to that of the vehicle using the own terminal. Accordingly, there is a high possibility that approximate specific sensing information is stored in the storage device as the object information corresponding to the current time point. Upon completion of the transmission of the object information from the vehicle-side communication unit, the inter-vehicle communication unit transmits a notification, not to store the object information with the peripheral communication terminals communicable with the own terminal, to the peripheral communication terminals. Accordingly, it is possible to avoid a situation where the approximate specific sensing information is stored in the storage device of all the peripheral vehicles of the vehicle using the own terminal. Further, upon completion of the transmission of the object information from the vehicle-side communication unit, the inter-vehicle communication unit transmits a notification, not to transmit the object information to the data center, to the peripheral communication terminals communicable with the own terminal. Accordingly, it is possible to suppress the waste of the communication cost by further transmitting the object information approximate to the object information to the data center which has already obtained the object information. As a result, it is possible to suppress the waste of the communication cost upon collection of sensing information and the waste of the capacity of the storage devices.

According to a fourth aspect of the present disclosure, a data center for communicating with a communication terminal that: is disposed in each of a plurality of vehicles; sequentially transmits vehicle information including a vehicle position of the vehicle mounting the communication terminal; sequentially obtains specific sensing information from a sensor of the vehicle; and stores the specific sensing information in a storage device in the vehicle for a predetermined period, the data center includes: a data center-side communication unit that communicates with each communication terminal; and a data center-side storage that stores information. The data center-side communication unit transmits a transmission request for requesting to transmit object information, which is the specific sensing information corresponding to a specific time point, to the communication terminal mounted in an object vehicle, which is one of the vehicles disposed approximately at a traveling position at the specific time point. The traveling position at the specific time point is specified based on the vehicle position in the vehicle information sequentially transmitted from the communication terminal. When the data center-side communication unit receives the object information transmitted from the communication terminal in a part of object vehicles, and the data center-side storage stores the object information, the data center-side communication unit transmits a deletion request for requesting to delete the object information stored in the storage device to the communication terminal in a remaining part of the object vehicles.

According to the above data center, the data center-side communication unit transmits a transmission request for transmission of the object information as the specific sensing information corresponding to a specific time point, to a communication terminal used in an object vehicle in an approximate traveling position at the specific time point. There is a high possibility that vehicles in traveling positions approximate to each other at a specific time point hold, in their storage devices, specific sensing information approximate to each other as object information corresponding to that time point. Accordingly, even when object information transmitted from the communication terminal in a part of the object vehicles is received and stored in the center-side storage, it is possible to collect object information corresponding to that time point. Further, when the data center-side communication unit receives the object information transmitted from the communication terminal in the part of the object vehicles and stores the received object information in the data center-side storage, the data center-side communication unit transmits a deletion request for deletion of the object information stored in the storage device to the communication terminal in the remaining object vehicles. Accordingly, it is possible to avoid the situation where the approximate specific sensing information is kept in the storage device of all the object vehicles. Further, in the communication terminal which has received the deletion request before transmission of the object information to the data center, as the object information stored in the storage device is deleted, the object information is not transmitted to the data center. Accordingly, it is possible to suppress the waste of the communication cost by further transmitting object information approximate to the already-obtained object information to the data center which has already obtained the object information. As a result, it is possible to suppress the waste of the communication cost upon collection of sensing information and the waste of the capacity of the storage device.

BRIEF DESCRIPTION OF THE DRAWINGS

The above and other objects, features and advantages of the present disclosure will become more apparent from the following detailed description made with reference to the accompanying drawings. In the drawings:

FIG. 8 is a diagram showing an example of a schematic configuration of a data center 3a;

FIG. 15 is a sequence chart showing an example of the flow of transmission of a transmission request from the data center 3b to the communication terminal 40b in the collection system 1b according to a ninth embodiment of the present disclosure.

DETAILED DESCRIPTION

First Embodiment

<Schematic Configuration of Collection System 1>

Figure 1:
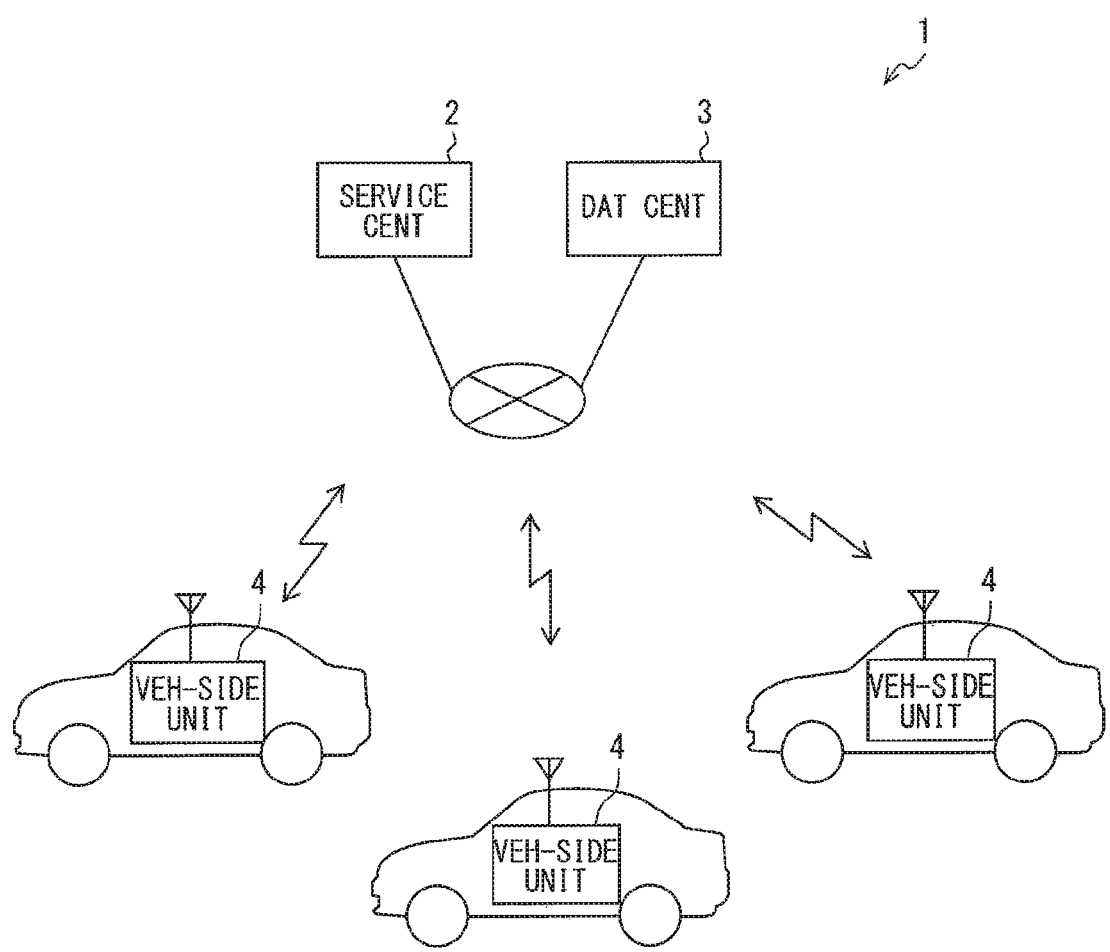
FIG. 1 is a diagram showing an example of a schematic configuration of a collection system 1.

Hereinbelow, a first embodiment of the present disclosure will be described using the drawings. As shown in FIG. 1, a collection system 1 includes a service center 2, a data center 3, and a vehicle-side unit 4 used in respective plural vehicles.

The service center 2 is e.g. a server device. The service center 2 obtains specific sensing information from a communication terminal 40 to be described later in the vehicle-side unit 4 in the plural vehicles via the data center 3. The service center 2 performs services utilizing the obtained specific sensing information. The specific sensing information may be information which is obtained with sensor(s) of the vehicle, and the estimated data amount of which is too large to be sequentially transmitted. Hereinafter, as an example, the specific sensing information is a captured image taken with a camera mounted in the vehicle.

As an example of the services performed with the service center 2, a traveling abnormality detection service of obtaining a captured image of an abnormality-occurred place and providing information on the abnormality is given. As another example, a remote monitoring service of obtaining a latest captured image and providing the captured image is given. It may be configured such that the service center 2 is provided by service. Note that the service center 2 may be configured with one server device, or may be configured with plural server devices. Hereinafter, the service center 2 performs the traveling abnormality detection service.

The service center 2 transmits a storage request for acquisition and storage of a captured image to the data center 3. In other words, the storage request is a "save query". Further, when the occurrence of abnormality on a road is detected, the service center 2 transmits a transmission request for transmission of a captured image corresponding to a specific time point in the abnormality-occurred place to the data center 3. The specific time point here may be, e.g., when the occurrence of abnormality before 5 minutes is detected with the service center 2, time corresponding to 5 minutes before. Further, the captured image corresponding to the specific time point may be a captured image at a specific time point, or may be a captured image including a fixed period before/after the specific time point. In other words, the transmission request is a "transfer query". It may be configured such that the detection of occurrence of abnormality on a road with the service center 2 is performed based on other sensing information than the specific sensing information sequentially collected from the communication terminal 40 to be described later in plural vehicles, or performed upon reception of a report from a user or the like.

The data center 3 is e.g. a server device. The data center 3 receives a request from the service center 2, collects captured images obtained with a camera of plural vehicles from the communication terminal 40 to be described later in the vehicles, and transmits the collected captured images to the service center 2. The data center 3 corresponds to a center. Note that the data center 3 may be configured with one server device, or may be configured with plural server devices. The details of the data center 3 will be described later.

The vehicle-side unit 4 is used in a vehicle. The vehicle-side unit 4 obtains sensing information obtained with the sensor(s) of the vehicle. Further, the vehicle-side unit 4 performs communication with the data center 3, and transmits sensing information obtained in the own vehicle to the data center 3. The details of the vehicle-side unit 4 will be described later.

<Schematic Configuration of Vehicle-Side Unit 4>

Figure 2:
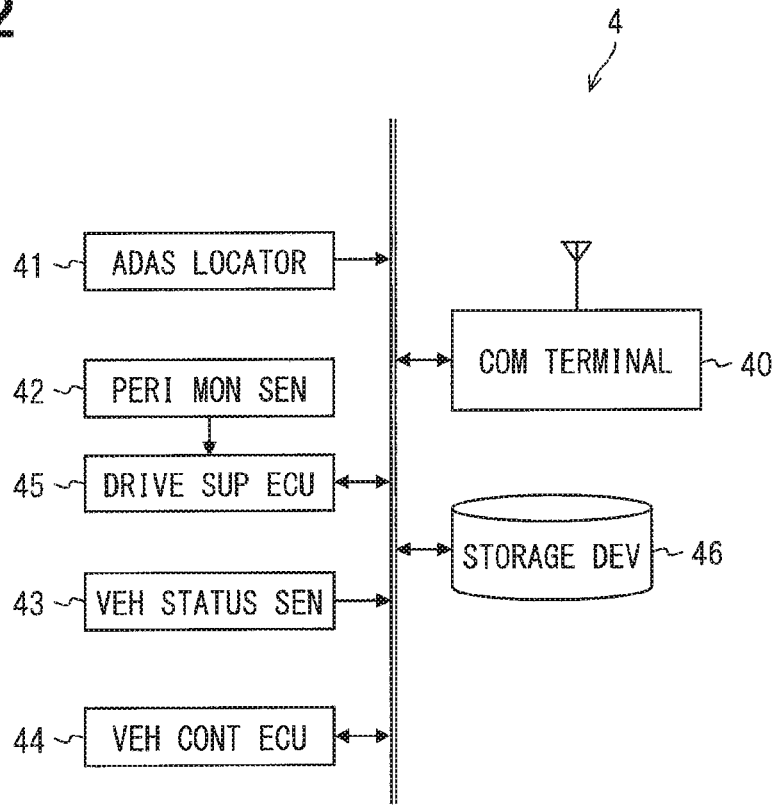
FIG. 2 is a diagram showing an example of a schematic configuration of a vehicle-side unit 4.

Next, using FIG. 2, an example of a schematic configuration of the vehicle-side unit 4 will be described. As shown in FIG. 2, the vehicle-side unit 4 has the communication terminal 40, an ADAS (Advanced Driver Assistance Systems) locator 41, a periphery monitor sensor 42, a vehicle status sensor 43, a vehicle control ECU 44, a drive support ECU 45, and a storage device 46. The communication terminal 40, the ADAS locator 41, the vehicle status sensor 43, the vehicle control ECU 44, the drive support ECU 45, and the storage device 46 are connected to e.g. a vehicle LAN.

The ADAS locator 41 has a GNSS (Global Navigation Satellite System) receiver, an inertial sensor, and a map database (hereinbelow, "DB") holding map data. The GNSS receiver receives a positioning signal from plural satellites. The inertial sensor has e.g. a gyro sensor and an acceleration sensor. The map DB is a nonvolatile memory holding link data, node data, and map data such as road shape data. Note that the map data may include a three-dimensional map made of a point group of feature points of road shapes and structures.

The ADAS locator 41 sequentially performs positioning of a vehicle position of the own vehicle having the ADAS locator 41, by combining the positioning signal received with the GNSS receiver and measurement result from the inertial sensor. Note that the positioning of the vehicle position may be performed by using traveling distance or the like obtained from detection result sequentially outputted from a vehicle speed sensor mounted in the own vehicle. The ADAS locator 41 outputs the measured vehicle position to the vehicle LAN. Further, the ADAS locator 41 reads the map data from the map DB, and outputs the map data to the vehicle LAN. Note that the map data may be obtained from a server outside the own vehicle via e.g. the communication terminal 40 to be described later.

The periphery monitor sensor 42 monitors the peripheral environment of the own vehicle. As an example, the periphery monitor sensor 42 detects obstacles around the own vehicle, e.g., moving objects such as pedestrians and other vehicles, and still objects such as fallen objects on the road. In addition, the periphery monitor sensor 42 detects traffic markings around the own vehicle such as a division line. The periphery monitor sensor 42 is a sensor such as a periphery monitoring camera to photograph a predetermined range around the own vehicle, a millimetric wave RADAR to transmit an exploration wave within a predetermined range around the own vehicle, a sonar, or a LIDAR (Light Detection and Ranging/Laser Imaging Detection and Ranging). The periphery monitoring camera sequentially outputs a sequentially-captured image as sensing information to the drive support ECU 45. The sensor such as the sonar, the millimetric wave RADAR, or the LIDAR to transmit an exploration wave, sequentially outputs a scan result based on a reception signal, obtained when a reflected wave from an obstacle is received, as sensing information, to the drive support ECU 45.

The vehicle status sensor 43 is a sensor group for detection of various statuses of the own vehicle such as a traveling status and an operation status. The vehicle status sensor 43 includes a vehicle speed sensor to detect a vehicle speed of the own vehicle, a steering sensor to detect a steering angle of the own vehicle, an accelerator position sensor to detect accelerator-pedal opening of the own vehicle, and a brake tread force sensor to detect a brake-pedal tread-in amount of the own vehicle. The vehicle status sensor 43 outputs detected sensing information to the vehicle LAN. Note that it may be configured such that the sensing information detected with the vehicle status sensor 43 is outputted via the ECU mounted in the own vehicle to the vehicle LAN.

The vehicle control ECU 44 is an electronic control device to perform acceleration/deceleration control and/or steering control on the own vehicle. The vehicle control ECU 44 includes a steering ECU to perform steering control, a power unit control ECU to perform acceleration/deceleration control, and a brake ECU. The vehicle control ECU 44 obtains detection signals outputted from the various sensors such as accelerator position sensor, the brake tread force sensor, the steering angle sensor, and a wheel speed sensor, mounted in the own vehicle. The ECU 44 outputs a control signal to various traveling control devices such as an electronic control throttle, a brake actuator, and an EPS (Electric Power Steering) motor. Further, the vehicle control ECU 44 is capable of outputting the sensing information from the above-described respective sensors to the vehicle LAN.

The drive support ECU 45 recognizes the peripheral environment of the own vehicle from the vehicle position of the own vehicle obtained from the ADAS locator 41, the map data, the sensing information obtained from the periphery monitor sensor 42, and the like. As an example, the drive support ECU 45 recognizes the shape and moving state of an object around the own vehicle, or recognizes the shape of a traffic marking around the own vehicle, from the detection result from the periphery monitor sensor 42. Then the drive support ECU 45 generates virtual space, three-dimensionally reproducing an actual traveling environment, by combining the vehicle position of the own vehicle and the map data.

Further, the drive support ECU 45 performs a driving support with respect to the own vehicle by execution of the acceleration/deceleration control and/or steering control on the own vehicle by cooperation with the vehicle control ECU 44, based on the recognized peripheral environment. As an example of the driving support, a driving support to keep traveling of the own vehicle within the line of the own vehicle, a driving support to keep fixed-speed traveling of the own vehicle, a driving support to perform automatic deceleration to avoid an obstacle, and the like, are given. Further, as a driving support, it may be configured such that automatic driving is realized by automatically performing acceleration, braking, and steering of the own vehicle with the vehicle control ECU 44. When the automatic driving is performed, a traveling plan for automatic traveling of the own vehicle with the automatic driving function is generated based on the recognized traveling environment. As the traveling plan, a medium- and long-term traveling plan and a short-term traveling plan are generated. In the medium- and long-term traveling plan, a route to direct the own vehicle to a set goal is generated. In the short-term traveling plan, a scheduled travel path to realize traveling according to the medium- and long-term traveling plan is generated by using the generated virtual space around the own vehicle.

The storage device 46 is a rewritable nonvolatile memory. For example, as the storage device 46, a magnetic disk, a flash memory or the like may be used. The storage device 46 holds a captured image obtained with the periphery monitoring camera in the periphery monitor sensor 42 as specific sensing information to be transmitted to the data center 3. Further, the storage device 46 holds other information than the above-described specific sensing information (hereinbelow, vehicle information) including any one of the statuses of the communication terminal 40 used in the own vehicle and the own vehicle.

As an example of the vehicle information, sequentially-changing variable vehicle information such as a vehicle position of the own vehicle sequentially obtained from the ADAS locator 41, a vehicle speed of the own vehicle sequentially obtained from the vehicle speed sensor in the vehicle status sensor 43, a traveling plan of the own vehicle sequentially obtained from the drive support ECU 45, a capacity of the storage device 46 (hereinbelow, storage amount), onboard-equipment control information transmitted via the vehicle LAN, and symbolic data, generated by segmenting the control information by cluster and symbolizing the segmented information, and the like, is given. Further, as an example of the vehicle information, fixed vehicle information such as a vehicle model of the own vehicle, services performed with the service center 2 used in the own vehicle (hereinbelow, utilized services), a communication method available for the communication terminal 40 of the own vehicle, a telecommunications standard to which the communication terminal 40 of the own vehicle is conformable, a band available for the communication terminal 40 of the own vehicle (hereinbelow, a communication resource), a sensor configuration of the own vehicle, and the like, is given. As the sensor configuration, e.g. in the case of the periphery monitoring camera, a camera type such as front/rear camera based on image-capturing direction, a resolution, a frame rate, and the like are given. Note that a communication resource which changes in correspondence with place and time may be handled as variable vehicle information.

It may be configured such that in the vehicle information, the fixed vehicle information is stored in the storage device 46 in e.g. a dealer, and each time the fixed vehicle information is changed, the fixed vehicle information stored in the storage device 46 is updated with the dealer.

The communication terminal 40 performs communication with the data center 3. The communication terminal 40 has a configuration to utilize plural types of communication methods at different communication costs. The communication terminal 40 selects one of the plural communication methods and performs communication with the data center 3. The number of plural types of communication methods available for the communication terminal 40 may be three or more. In the present embodiment, for the sake of convenience, two types of communication methods, a higher-cost communication method and a lower-cost communication method, are available. Hereinafter, LTE (Long Term Evolution) will be given as an example of the higher-cost communication method, while Wi-Fi (registered trademark) will be given as an example of the lower-cost communication method.

Note that in the collection system 1, the communication terminals 40 respectively used in the plural vehicles may utilize different types of communication methods, or may correspond to different telecommunications standards, or may utilize different bands.

Further, the communication terminal 40 sequentially transmits the sequentially-obtained variable vehicle information to the data center 3, and transmits the fixed vehicle information to the data center 3. It may be configured such that the variable vehicle information and the fixed vehicle information are stored in the storage device 46 and are read from the storage device 46 and transmitted. It may be configured such that, to suppress the waste of the communication cost, the fixed vehicle information is not transmitted until the information is updated. Further, upon transmission of information to the data center 3, the communication terminal 40 may also transmit an ID to identify the own terminal or the vehicle using the own terminal, to discriminate each information from the communication terminal 40 in the data center 3. Hereinafter, the ID is a terminal ID. The transmission of a captured image, as an example of the specific sensing information, in the communication terminal 40, will be described in detail later.

<Schematic Configuration of Data Center 3>

Figure 3:
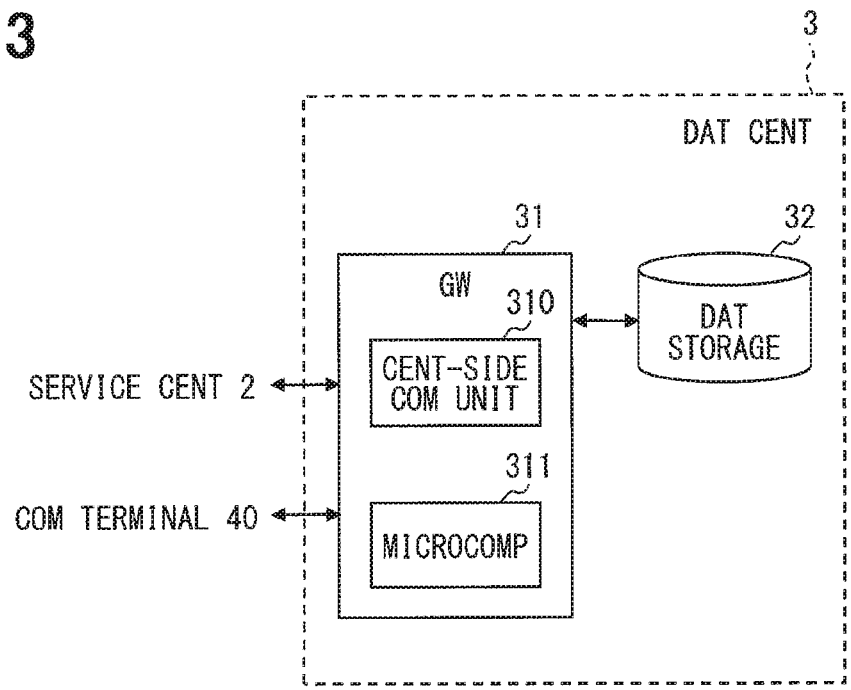
FIG. 3 is a diagram showing an example of a schematic configuration of a data center 3.

Next, using FIG. 3, an example of a schematic configuration of the data center 3 will be described. As shown in FIG. 3, the data center 3 has a gateway (hereinbelow, GW) 31 and a data storage 32. The GW 31 has a center-side communication unit 310 and a microcomputer 311. The GW 31 performs communication with the service center 2 and the communication terminal 40 used in the plural vehicles in the collection system 1. As the GW 31, a communication module may be used.

The center-side communication unit 310 performs communication with the service center 2 and the communication terminal 40. The center-side communication unit 310 is configured to be conformable to the plural types of communication methods in the communication terminal 40. The microcomputer 311, having a processor, a memory, an I/O, and a bus connecting these constituents, executes a control program stored in the memory so as to perform various processing related to the communication control in the data center 3. Note that the memory here is a non-transitory tangible storage medium for non-transitory storage of computer-readable program and data. Further, the non-transitory tangible storage medium is realized with a semiconductor memory, a magnetic disk, or the like.

The data storage 32 is a rewritable nonvolatile memory using a magnetic disk, a flash memory, or the like. The data storage 32 holds the captured image obtained with the data center 3 from the communication terminal 40, the variable vehicle information, and the fixed vehicle information. The data storage 32 corresponds to a center-side storage.

When the center-side communication unit 310 receives a storage request for acquisition and storage of a captured image, transmitted from the service center 2, the data center 3 transmits the storage request from the center-side communication unit 310 to the communication terminal 40 used in the respective plural vehicles. The transmission of the storage request from the center-side communication unit 310 may be performed by using any of the plural types of communication methods. Note that it may be configured such that the transmission of the storage request is performed by using a communication method at a lower communication cost than that of the transmission of the transmission request. It may be configured such that the storage request includes an object period as an object of storage, and a valid period for setting the period of validity of the storage.

Further, when the center-side communication unit 310 receives the storage request transmitted from the service center 2, the data center 3 transmits a cost designation request for transmission of a captured image, with designation of an upper limit value of the communication cost of the communication used upon request for transmission of the captured image from the communication terminal 40, to the communication terminal 40 used in the respective plural vehicles. The transmission of the cost designation request from the center-side communication unit 310 may be performed by using any of the plural types of communication methods. Note that it may be configured such that the cost designation request is included in the storage request, or is included in the transmission request. Hereinafter, an example where the cost designation request is included in the storage request will be described.

Further, the data center 3 receives the captured image, the variable vehicle information, and the fixed vehicle information, transmitted from the communication terminal 40, with the center-side communication unit 310, and stores the received image and information in the data storage 32. When the captured image, the variable vehicle information, and the fixed vehicle information, received from the communication terminal 40, are stored in the data storage 32, the data center 3 stores the respective information from the communication terminal 40 discriminably based on the terminal ID received from the communication terminal 40.

Further, when the center-side communication unit 310 receives the transmission request for transmission of a captured image corresponding to a specific time point in an abnormality-occurred place (hereinbelow, object captured image), transmitted from the service center 2, the data center 3 performs the following processing. The object captured image corresponds to object information. Note that it may be configured such that the transmission request includes a request about communication quality such as allowed delay time. First, it is determined whether or not a captured image corresponding to the object captured image transmitted form the communication terminal 40 in an object vehicle as a part of vehicles in approximate traveling positions at this specific time point (object vehicles), is already stored in the data storage 32.

As an example of the approximation of traveling position, when a predetermined condition, e.g., "within a radius of 10 m from the abnormality-occurred place" is satisfied based on the vehicle position in the variable vehicle information, the approximation of traveling position may be determined. Further, in addition to the approximation of traveling position, it is preferable that a vehicle in which the periphery monitoring camera to obtain a captured image has an approximate sensor configuration is an object vehicle. There is a high possibility that vehicles having an approximate sensor configuration, in addition to an approximate traveling position at a specific time point, have a more approximate object captured image, as an object captured image corresponding to the time point, in the storage device 46. As an example of approximation of sensor configuration of the periphery monitoring camera, when predetermined conditions are satisfied, for example when the camera based on image-capturing direction is the same and the resolution and the frame rate are within a predetermined threshold range, the approximation of sensor configuration may be determined.

Further, when a captured image is used as specific sensing information, it is preferable that a vehicle also having an approximate direction (i.e., the traveling direction) is selected as an object vehicle. There is a high possibility that vehicles having an approximate direction, in addition to the traveling position at a specific time point, hold a more approximate object captured image, as an object captured image corresponding to the time point, in the storage device 46. It may be configured such that the direction is specified from vehicle positions at plural points along time sequence, or it may be configured such that the direction is included in the variable vehicle information and the direction is specified from the variable vehicle information. The range of approximation of direction may be arbitrarily set.

When it is determined that a captured image corresponding to the object captured image is already stored in the data storage 32, the data center 3 does not transmit the transmission request to the communication terminal 40, but transmits a deletion request for deletion of the captured image corresponding to the specific time point stored in the storage device 46 (i.e., the object captured image) to the communication terminal 40 in the remaining object vehicles. On the other hand, when it is determined that the captured image is not stored, the data center 3 transmits the transmission request from the center-side communication unit 310 to the communication terminal 40 used in the object vehicles.

After the transmission of the transmission request to the communication terminal 40 used in the object vehicles, when the object captured image transmitted from the communication terminal 40 in object vehicle(s) as a part of the object vehicles is received with the center-side communication unit 310 and is stored in the data storage 32, the data center 3 transmits the above-described deletion request to the communication terminal 40 in the remaining object vehicles. In the communication terminal 40 which has received the deletion request, the object captured image stored in the storage device 46 is deleted, and there is no object captured image to be transmitted to the data center 3. Accordingly, transmission of object capture image is not performed. Note that it is preferable that the data center 3 requires in the deletion request not to transmit the object captured image. According to this configuration, it is possible to more infallibly prevent transmission of the object captured image from the communication terminal 40.

Note that the "object vehicles as a part of the object vehicles" may be a required number of object vehicles for collection of the object captured image. The number of object vehicles may be one. It may be configured such that the required number of object vehicles for collection of the object captured image is transmitted from the service center 2 to the data center 3. Further, the number of remaining object vehicles is other object vehicles than the object vehicle(s) as transmission originator(s) of the object captured image stored in the data storage 32, among the object vehicles.

Further, the data center 3 transmits the object captured image stored in the data storage 32 to the service center 2 as a transmission originator of the transmission request.

<Schematic Configuration of Communication Terminal 40>

Figure 4:
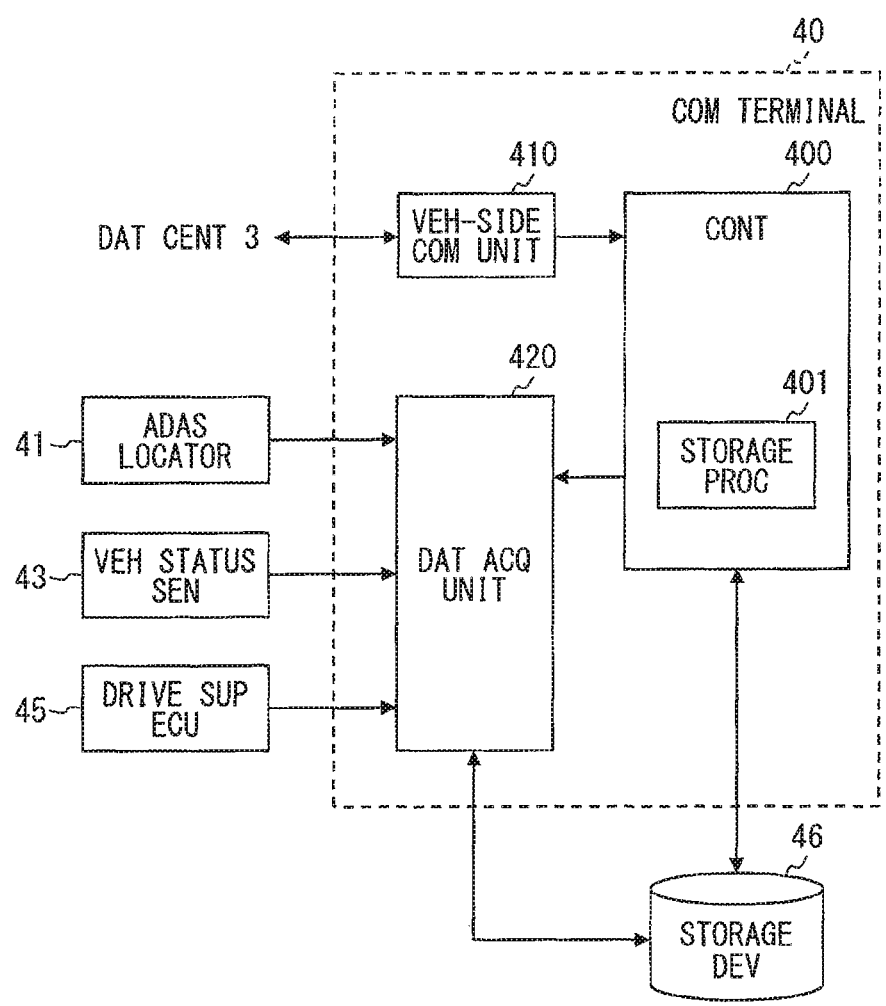
FIG. 4 is a diagram showing an example of a schematic configuration of a communication terminal 40.

Next, using FIG. 4, a schematic configuration of the communication terminal 40 will be described. As shown in FIG. 4, the communication terminal 40 has a controller 400, a vehicle-side communication unit 410, and a data acquisition unit 420. Further, the controller 400 has a storage processor 401.

The vehicle-side communication unit 410 has plural wireless communication antennas for utilization of plural types of communication methods at different communication costs. The vehicle-side communication unit 410 is configured to perform mobile communication with respect to e.g. a base station, and perform information transmission/reception by wireless communication with respect to e.g. a wireless LAN access point. The vehicle-side communication unit 410 is communicable with the data center 3 via a base station, the Internet, or a public communication network such as a mobile phone network, based on control with the controller 400.

The data acquisition unit 420 sequentially obtains the variable vehicle information such as a vehicle position sequentially obtained with the ADAS locator 41, a vehicle speed of the own vehicle sequentially obtained with the vehicle status sensor 43, a traveling plan of the own vehicle sequentially obtained with the drive support ECU 45, and a storage amount obtained by monitoring the storage device 46. As an example, it may be configured such that, when an ignition power source of the own vehicle is turned ON, the data acquisition unit 420 sequentially obtains the variable vehicle information, associates variable vehicle information with a time stamp, and stores the variable vehicle information in the storage device 46. Note that it may be configured such that the variable vehicle information is sequentially stored in the storage device 46, and sequentially deleted from variable vehicle information of which a fixed period has elapsed. Otherwise, the variable vehicle information may be updated by overwriting with newly-stored variable vehicle information.

Further, it may be configured such that, when the vehicle-side communication unit 410 receives a storage request from the data center 3, the data acquisition unit 420 starts acquisition of a captured image sequentially obtained with the periphery monitoring camera via the drive support ECU 45, and sequentially stores the captured image in the storage device 46. It may be configured such that a time stamp is added upon storage of the captured image in the storage device 46. Note that it is preferable that a storage period of a captured image is set and then the captured image is stored in the storage device 46, such that a captured image with expired storage period is deleted, to avoid storage of the period-expired captured image, even though the communication terminal 40 does not receive a deletion instruction to be described later. The storage period may be arbitrarily set.

The controller 400 is configured with, as a main body, a microcomputer having a processor, a memory, an I/O, and a bus connecting these constituents. The controller 400 executes a control program stored in the memory to perform various processing related to the control in the communication terminal 40. Note that the memory here is a non-transitory tangible storage medium for non-transitory storage of computer-readable program and data. Further, the non-transitory tangible storage medium is realized with a semiconductor memory, a magnetic disk, or the like.

The controller 400 sequentially reads the variable vehicle information and the time stamp stored in the storage device 46, and sequentially transmits the read variable vehicle information and the time stamp from the vehicle-side communication unit 410 to the data center 3. The storage processor 401 of the controller 400 may be configured to delete the variable vehicle information, the transmission to the data center 3 of which has been completed, from the storage device 46. Further, the controller 400 reads the fixed vehicle information stored in the storage device 46, and transmits the read fixed vehicle information from the vehicle-side communication unit 410 to the data center 3. It is not necessarily configured such that the fixed vehicle information is sequentially transmitted as in the case of the variable vehicle information. For example, it may be configured such that each time the fixed vehicle information is changed, the fixed vehicle information is transmitted to the data center 3.

When the storage request from the data center 3 is received with the vehicle-side communication unit 410, the storage processor 401 of the controller 400 obtains a captured image from the periphery monitoring camera with the data acquisition unit 420 and stores the captured image in the storage device 46 as described above.

Further, when the vehicle-side communication unit 410 receives the cost designation request in addition to the storage request from the data center 3, the controller 400 reads the captured image stored in the storage device 46 at timing where communication is possible at a communication cost equal to or lower than the upper limit value of the communication cost designated with the cost designation request. The read captured image may be e.g. a captured image in a latest fixed period, or a captured image in the whole storage period. Then, using communication at a communication cost equal to or lower than the designated communication cost, the controller 400 transmits the captured image from the vehicle-side communication unit 410 to the data center 3. For example, when the vehicle-side communication unit 410 performs communication by utilizing LTE and Wi-Fi, and communication at a communication cost equal to or lower than the upper limit value of the designated communication cost is realized only by utilizing Wi-Fi, at timing of entry into a Wi-Fi access spot, the vehicle-side communication unit 410 transmits the captured image to the data center 3 by utilizing Wi-Fi. It may be configured such that upon transmission of the captured image, the time stamp and the terminal ID are also transmitted. The storage processor 401 may be configured to delete the captured image, the transmission to the data center 3 of which has been completed, from the storage device 46.

Further, when the vehicle-side communication unit 410 receives the transmission request from the data center 3, the controller 400 reads the object captured image which corresponds to the time point of requirement with the transmission request and which is stored in the storage device 46, and transmits the object captured image from the vehicle-side communication unit 410 to the data center 3. In this case, the controller 400 may use communication available for the vehicle-side communication unit 410 to transmit the object captured image from the vehicle-side communication unit 410 to the data center 3. It may be configured such that, upon transmission of the object captured image, the terminal ID is also transmitted. Note that it is preferable such that, to further suppress the waste of the communication cost, the controller 400 transmits the object captured image to the data center 3 by using lower-cost communication among the communications available for the vehicle-side communication unit 410. The storage processor 401 may be configured to delete the object captured image, the transmission to the data center 3 of which has been completed, from the storage device 46.

Further, when the vehicle-side communication unit 410 receives the deletion request from the data center 3, the storage processor 401 of the controller 400 deletes the captured image stored in the storage device 46 corresponding to the specific time point of deletion requirement with the deletion request, from the storage device 46.

<Collection-Related Processing in Data Center 3>

Figure 5:
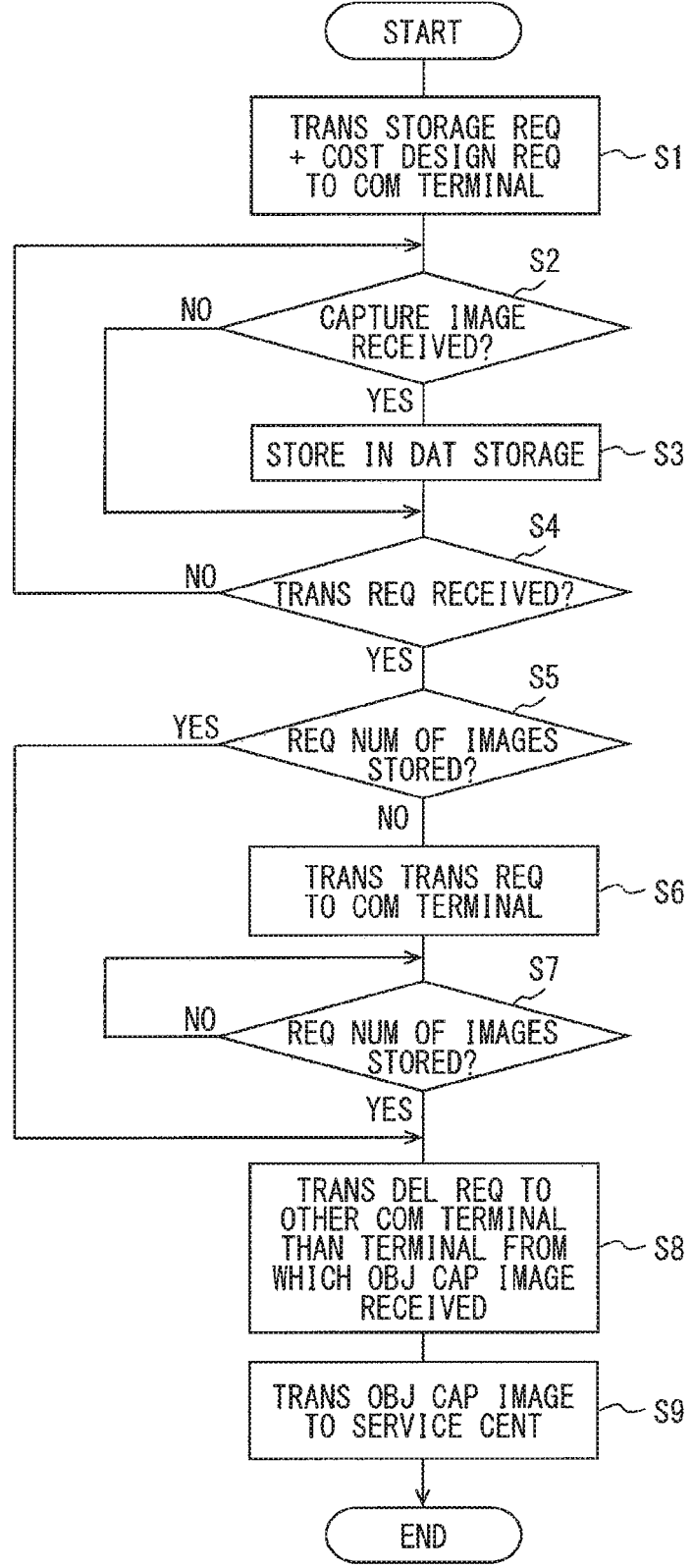
FIG. 5 is a flowchart showing an example of the flow of collection-related processing in the data center 3.

Next, an example of the flow of processing related to the collection of the object captured image (hereinbelow, collection-related processing) in the data center 3 will be described by using the flowchart of FIG. 5. It may be configured such that the flowchart of FIG. 5 is started when the storage request is received from the service center 2. Note that the data center 3 has received the variable vehicle information and the fixed vehicle information from the communication terminal 40 communicable with the data center 3 prior to the reception of the storage request from the service center 2.

First, at step S1, the center-side communication unit 310 transmits a storage request and a cost designation request to the communication terminal 40 used in the respective plural vehicles. The communication terminal 40 which has received the storage request and the cost designation request, starts storage of a captured image obtained with the periphery monitoring camera in the storage device 46. When communication is possible at a cost equal to or lower than the upper limit value of communication cost designated with the cost designation request, the communication terminal 40 transmits the stored captured image to the data center 3. The communication terminal 40 may be configured to transmit the variable vehicle information in addition to the captured image.

At step S2, when the center-side communication unit 310 receives the captured image transmitted from the communication terminal 40 (YES at S2), the process proceeds to step S3. On the other hand, when the center-side communication unit 310 does not receive the captured image (NO at S2), the process proceeds to step S4. At step S3, the microcomputer 311 associates the captured image received at step S2 with the terminal ID of the originator of the transmission of the captured image, the time stamp of the captured image, and a vehicle position where the captured image has been obtained, and stores the captured image in the data storage 32. As an example, the microcomputer 311 may be configured to specify, among the vehicle positions included in the variable vehicle information obtained with the data center 3 from the communication terminal 40 with the terminal ID, a vehicle position associated with a time stamp approximate to the time stamp of the captured image, as a vehicle position where the captured image has been obtained.

At step S4, when the center-side communication unit 310 receives a transmission request transmitted from the service center 2 (YES at S4), the process proceeds to step S5. On the other hand, when the center-side communication unit 310 does not receive the transmission request (NO at S4), the process returns to S2 to repeat the processing. At step S5, when it is determined that a required number or more of captured images corresponding to the specific time point in the abnormality-occurred place, required with the transmission request (i.e., the object captured images) are already stored in the data storage 32 (YES at S5), the process proceeds to step S8. On the other hand, when the required number of captured images are not stored (NO at S5), the process proceeds to step S6. The determination as to whether or not the required number of captured images are stored may be made with the microcomputer 311. Further, the object captured image corresponding to the specific time point in the abnormality-occurred place is not limited to a captured image having associated vehicle position and time stamp completely corresponding to the abnormality-occurred place and the specific time point. The object captured image may include a captured image having errors within a predetermined range. Further, the required number may be designated with e.g. the transmission request.

At step S6, based on the specific time point of the abnormality-occurred place required with the transmission request, transmitted from the service center 2, the microcomputer 311 extracts the communication terminal 40 used in object vehicles in traveling positions approximate to the abnormality-occurred place at the specific time point. As an example, the communication terminal 40 is extracted by extracting a terminal ID associated with a vehicle position and a time stamp corresponding to the abnormality-occurred place and the specific time point in the variable vehicle information stored in the data storage 32. It may be configured such that the vehicle position and its time stamp corresponding to the abnormality-occurred place and the specific time point are not limited to those completely match the abnormality-occurred place and the specific time point, but a vehicle position and a time stamp within a fixed error range are included. Then the center-side communication unit 310 transmits a transmission request to the extracted communication terminal 40. Further, at step S6, it is preferable that the microcomputer 311 extracts the communication terminal 40 used in object vehicles having an approximate sensor configuration in the fixed vehicle information.

The communication terminal 40 which has received the transmission request, transmits the object captured image required with the transmission request, among captured images obtained with the periphery monitoring camera and stored in the storage device 46, to the data center 3. When the center-side communication unit 310 receives the object captured image from the communication terminal 40, the data center 3 associates the received object captured image with the terminal ID of the transmission-originator communication terminal 40 and stores the object captured image in the data storage 32.

At step S7, when it is determined that the above-described required number of object captured images are stored in the data storage 32 (YES at S7), the process proceeds to step S8. On the other hand, that the above-described required number of object captured images are not stored (NO at S7), the processing at step S7 is repeated. The determination as to whether or not the above-described required number of object captured images are stored may be made with the microcomputer 311.

At step S8, the center-side communication unit 310 transmits a deletion request to other communication terminals 40 than the communication terminals 40 from which the object captured images have been obtained, among the communication terminals 40 to which the transmission request has been transmitted at step S6. For example, the other communication terminals 40 than the communication terminal 40 from which the object captured images have been obtained may be specified by subtracting the terminal ID associated with the object captured image stored in the data storage 32 from the terminal IDs of the communication terminals 40 to which the transmission request has been transmitted, with the microcomputer 311. At step S9, the center-side communication unit 310 transmits the required number of object captured images stored in the data storage 32 to the service center 2. Then the collection-related processing in the data center 3 is ended.

<Collection-Related Processing in Communication Terminal 40>

Figure 6:
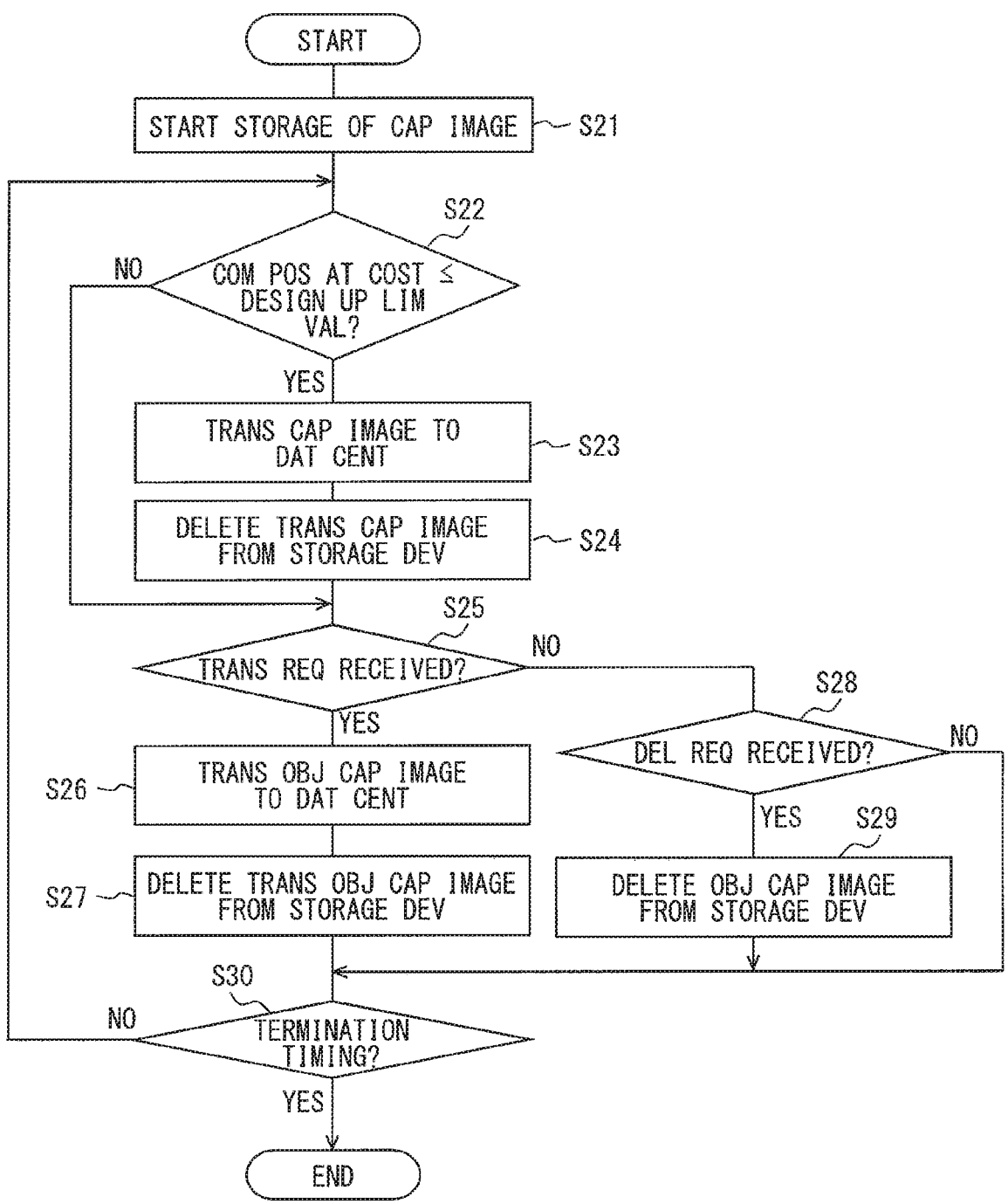
FIG. 6 is a flowchart showing an example of the flow of collection-related processing in the communication terminal 40.

Next, using the flowchart of FIG. 6, an example of the flow of the collection-related processing regarding the collection of the object captured images in the communication terminal 40 will be described. It may be configured such that in the flowchart of FIG. 6, the processing is started when a storage request and a cost designation request are received from the data center 3. Note that in the communication terminal 40, in addition to the transmission of a captured image to the data center 3, transmission of the variable vehicle information and the fixed vehicle information to the data center 3 is performed.

At step S21, the storage processor 401 starts storage of a captured image from the periphery monitoring camera, sequentially obtained with the data acquisition unit 420, in the storage device 46. It may be configured such that the captured image is associated with a time stamp of the captured image, and the captured image is stored in the storage device 46.

At step S22, when communication between the vehicle-side communication unit 410 and the data center 3 is possible at a communication cost equal to or lower than the upper limit value of the communication cost designated with the cost designation request received with the vehicle-side communication unit 410 from the data center 3 (YES at S22), the process proceeds to step S23. On the other hand, when the communication is not possible at a communication cost equal to or lower than the upper limit value of the communication cost designated with the cost designation request (NO at S22), the process proceeds to step S25.

At step S23, the controller 400 reads the captured image stored in the storage device 46, and the vehicle-side communication unit 410 transmits the captured image using communication at a communication cost equal to or lower than the upper limit value of the communication cost designated with the cost designation request, to the data center 3. It may be configured such that, upon transmission of the captured image, the vehicle-side communication unit 410 associates the captured image with the variable vehicle information, in addition to the time stamp and the terminal ID of the captured image, and transmits the captured image to the data center 3. At step S24, the storage processor 401 deletes the captured image transmitted at step S23 from the storage device 46.

At step S25, when the vehicle-side communication unit 410 receives a transmission request transmitted from the data center 3 (YES at S25), the process proceeds to step S26. On the other hand, when the vehicle-side communication unit 410 does not receive the transmission request (NO at S25), the process proceeds to step S28.

At step S26, the controller 400 reads the captured image corresponding to the specific time point in the abnormality-occurred place required with the transmission request (i.e., object captured image) from the captured images obtained with the periphery monitoring camera stored in the storage device 46. Then the vehicle-side communication unit 410 transmits the object captured image to the data center 3. It may be configured such that upon transmission of the object captured image, the vehicle-side communication unit 410 associates the object captured image with the time stamp of the object captured image and the terminal ID, and transmits the object captured image to the data center 3. At step S27, the storage processor 401 deletes the object captured image transmitted at step S26 from the storage device 46. Then the process proceeds to step S30.

At step S28, when the vehicle-side communication unit 410 receives a deletion request transmitted from the data center 3 (YES at S28), the process proceeds to step S29. On the other hand, when the vehicle-side communication unit 410 does not receive the deletion request transmitted from the data center 3 (NO at S28), the process proceeds to step S30. At step S29, the vehicle-side communication unit 410 does not perform transmission of the object captured image, in addition, the storage processor 401 deletes the object captured image stored in the storage 46. Then the process proceeds to step S30.

At step S30, when it is determined that it is timing of the termination of the collection-related processing in the communication terminal 40 (YES at S30), the collection-related processing in the communication terminal 40 is terminated. On the other hand, when it is not the timing of the termination of the processing (NO at S30), the process returns to step S22, to repeat the processing. As an example of the timing of the termination of the collection-related processing in the communication terminal 40, turning OFF of the ignition power source of the own vehicle is given.

<Collection-Related Processing in Collection System 1>

Figure 7:
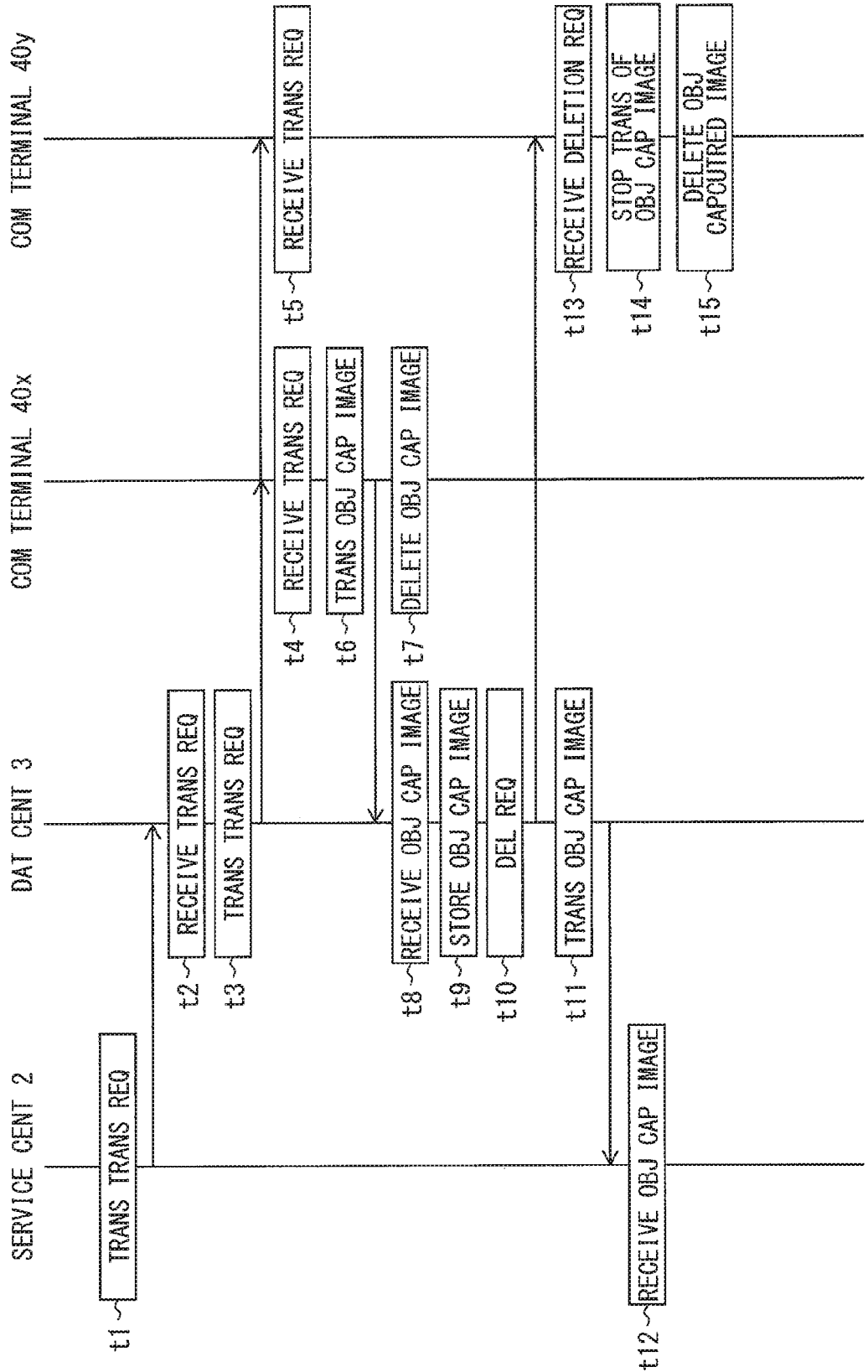
FIG. 7 is a sequence chart showing an example of the flow of collection-related processing in the collection system 1.

Next, using the sequence chart of FIG. 7, an example of the flow of the collection-related processing in the collection system 1 will be described. In the sequence chart of FIG. 7, the required number of object captured images is 1. One of the communication terminals 40 in two object vehicles, which first transmits an object captured image to the data center 3, will be referred to as a "communication terminal 40x", while the latter communication terminal 40 will be referred to as a "communication terminal 40y". Further, the sequence chart of FIG. 7 shows a sequence in an example where the data storage 32 holds no object captured image when the data center 3 receives a transmission request from the service center 2, then the data center 3 transmits a transmission request to the communication terminals 40x and 40y.

First, the service center 2 transmits a transmission request to the data center 3 (t1). The data center 3 receives the transmission request transmitted from the service center 2 with the center-side communication unit 310 (t2). Then the data center 3 transmits the transmission request from the center-side communication unit 310 to the communication terminals 40x and 40y of the object vehicles (t3). The communication terminals 40x and 40y receive the transmission request transmitted from the data center 3 with the vehicle-side communication unit 410 (t4 and t5).

In the communication terminal 40x, the vehicle-side communication unit 410 transmits an object captured image stored in the storage device 46 to the data center 3 (t6). Then the storage processor 401 deletes the object captured image stored in the storage device 46 (t7). The data center 3 receives the object captured image transmitted from the communication terminal 40x (t8), and stores the received object captured image in the data storage 32 (t9). The data center 3 which has stored the object captured image in the data storage 32, transmits a deletion request from the center-side communication unit 310 to the communication terminal 40y (t10). Further, the data center 3 which has stored the object captured image in the data storage 32, transmits the stored object captured image from the center-side communication unit 310 to the service center 2 (t11). The service center 2 receives the object captured image transmitted from the data center 3, thus obtains the object captured image (t12).

On the other hand, the communication terminal 40y which has not transmitted an object captured image earlier than the communication terminal 40x, receives the deletion request transmitted from the data center 3 with the vehicle-side communication unit 410 (t13), In the communication terminal 40y which has received the deletion request, transmission of the object captured image with the vehicle-side communication unit 410 is stopped (t14). The storage processor 401 deletes the object captured image stored in the storage device 46 (t15).

Note that in this example, it is configured such that the data center 3 simultaneously transmits a transmission request toward plural communication terminals 40, however, the present disclosure is not necessarily limited to this configuration. It may be configured such that when delay time in which communication quality required with the transmission request is allowed is sufficient and is e.g. 10 minutes, the transmission request is transmitted, respectively with a time difference, to the plural communication terminals 40.

Further, the data center 3 may be configured to transmit the transmission request plural times while sequentially selecting communication used for the transmission request from communication at a low communication cost toward communication at a high communication cost, until a required number of object captured images are stored in the data storage 32. In this case, it is preferable that each time the communication used for transmission request is changed to communication at a higher communication cost, the above-described predetermined condition for selection of transmission destinations of the transmission request is changed so as to narrow the number of transmission destinations. According to this configuration, it is possible to suppress the communication cost in the collection system 1 by reducing the number of communication destinations while changing communication used for transmission of transmission request to communication at a higher communication cost.

Generalization of First Embodiment

According to the configuration of the first embodiment, the center-side communication unit 310 transmits a transmission request to the communication terminal 40 used in object vehicle(s) in a traveling position approximate to an abnormality-occurred place at a specific time point. There is a high possibility that in the object vehicles in a traveling position approximate to the abnormality-occurred place at the specific time point, an approximate object image about the abnormality-occurred place is stored, as an object captured image corresponding to the time point, in the storage device 46. Accordingly, there is a high possibility that when the object captured image transmitted from the communication terminal 40 in the object vehicle(s) as a part of the object vehicles is received and stored in the data storage 32, the captured images about the abnormality-occurred place are collected without collecting object captured images from the other object vehicles.

On the other hand, according to the configuration of the first embodiment, when the data center 3 receives the object captured image transmitted from the communication terminal 40 in the object vehicle(s) as a part of the object vehicles and stores the received object captured image in the data storage 32, the data center 3 transmits a deletion request for deletion of the object captured image stored in the storage device 46 to the communication terminal 40 in the remaining object vehicles. Accordingly, it is possible to avoid a situation where the approximate object captured image is stored in the storage device 46 in all the object vehicles. Further, in the communication terminal 40 which has received the deletion request, since transmission of the object captured image to the data center 3 is stopped, it is possible to suppress the waste of the communication cost for further transmitting the object captured image approximate to the already obtained object captured image to the data center 3. As a result, it is possible to suppress the waste of the communication cost upon collection of sensing information and the waste of the capacity of the storage device 46.

Further, according to the configuration of the first embodiment, in a situation where communication is possible at a communication cost equal to or lower than the upper limit value of the communication cost designated with the cost designation request, the communication terminal 40 transmits the captured image stored in the storage device 46 from the vehicle-side communication unit 410 to the data center 3 using the communication at the communication cost equal to or lower than the upper limit value of the designated communication cost. In the communication at the communication cost equal to or lower than the upper limit value of the designated communication cost, as the communication cost is suppressed, it is possible to suppress the waste of the communication cost. Further, the communication terminal 40 deletes the captured image transmitted to the data center 3 from the storage device 46. Accordingly, it is possible to suppress the waste of the capacity of the storage device 46 due to storage of the captured image, obtained with the data center 3, in the storage device 46.

Second Embodiment

In the first embodiment, when the data center 3 has stored the required number of object captured images in the data storage 32, the data center 3 transmits a deletion request, however, the present disclosure is not necessarily limited to this configuration. For example, it may be configured such that, regarding an object captured image, of which a valid period required with the storage request is short, the data center 3 does not transmit the deletion request even when the data center 3 has stored the required number of object captured images in the data storage 32. In a case where this configuration is adopted, even when the deletion request is not transmitted, the object captured image is deleted in a short period and the waste of the capacity of the storage device 46 is suppressed, it is possible to also suppress the communication cost of the transmission of the deletion request.

Further, it may be configured such that when the communication cost designated with the cost designation request is set to a value equal to or lower than a sufficiently low threshold value, the deletion request is not transmitted.

Third Embodiment

Further, the present disclosure is not limited to the configuration where the data center 3 transmits a deletion request to the communication terminal 40. For example, it may be configured such that the communication terminal 40 inquires the data center 3 as to whether or not the object captured image in the own vehicle is deleted, and when the required number of object captured images are stored in the data storage 32 of the data center 3, the data center 3 replies to the communication terminal 40 with a permission to delete the object captured image, and the communication terminal 40 deletes the object captured image in the own vehicle.

Fourth Embodiment

In the above-described first embodiment, the data center 3 transmits a cost designation request, however, the present disclosure is not necessarily limited to this configuration. For example, it may be configured such that the data center 3 does not transmit the cost designation request (hereinbelow, a fourth embodiment).

When the fourth embodiment is adopted, it may be configured such that the communication terminal 40 does not transmit a captured image as specific sensing information to the data center 3 until the communication terminal 40 receives a transmission request from the data center 3. For example, it may be configured such that in the flowchart of FIG. 5, the cost designation request is not transmitted at step S1, and the processing at steps S2 to S3 is omitted. In the flowchart of FIG. 6, the processing at steps S22 to S24 may be omitted.

Even in the configuration of the fourth embodiment, the communication terminals 40 to transmit the object captured image to the data center 3 are narrowed to a part of the communication terminals 40 in the plural object vehicles. In the object vehicle from which the object captured image has not been transmitted to the data center 3, the object captured image stored in the storage device 46 is deleted. Accordingly, it is possible to suppress the waste of the communication cost upon collection of sensing information and the waste of the capacity of the storage device 46.

Fifth Embodiment

In the above-described embodiment, the data center 3 transmits a storage request to all the communication terminals 40 included in the collection system 1, however, the present disclosure is not necessarily limited to this configuration. For example, it may be configured such that the data center 3 limitedly transmits the storage request to communication terminals 40 which satisfy a predetermined condition among the communication terminals 40 included in the collection system 1 (hereinbelow, a fifth embodiment).

Hereinbelow, the configuration of the fifth embodiment will be described. The collection system 1 according to the fifth embodiment is the same as the collection system 1 according to the first embodiment except that the collection system 1 according to the fifth embodiment includes a data center 3a in place of the data center 3. Next, using FIG. 8, the data center 3a will be described.

Figure 8:
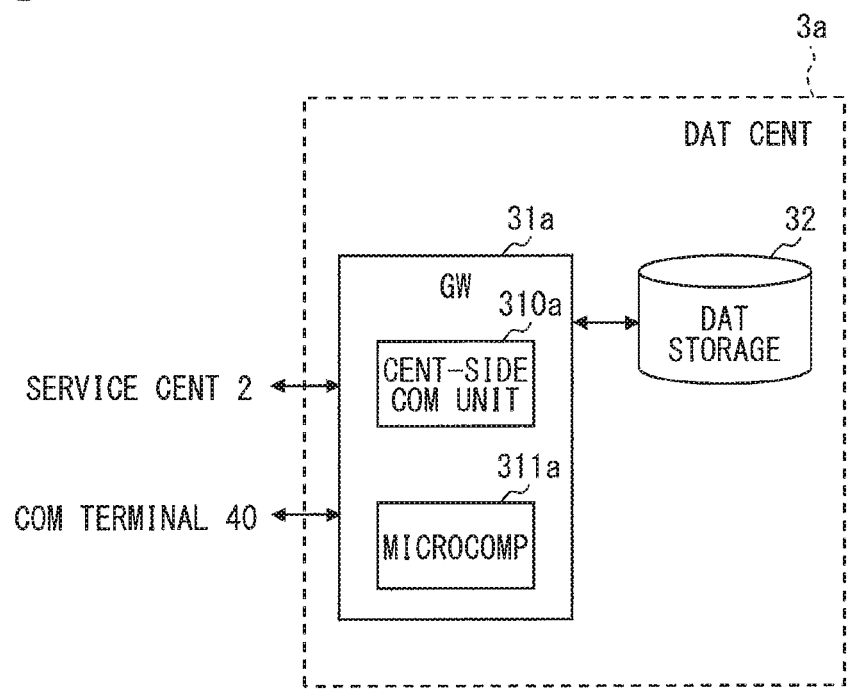

As shown in FIG. 8, the data center 3a has a GW 31a and the data storage 32. The data center 3a is the same as the data center 3 according to the first embodiment except that the data center 3a has the GW 31a in place of the GW 31. The GW 31a has a center-side communication unit 310a and a microcomputer 311a. The GW 31a is the same as the GW 31 according to the first embodiment except that the GW 31a limits communication terminals 40 which satisfy a predetermined condition, among the communication terminals 40 included in the collection system 1, as the objects of transmission of the storage request. The data center 3a also corresponds to the center.

In the data center 3a, when the center-side communication unit 310a receives a storage request transmitted from the service center 2, the microcomputer 311a selects communication terminals 40 which satisfy a predetermined condition based on the vehicle information such as the variable vehicle information or the fixed vehicle information of the communication terminal 40 stored in the data storage 32. Then, the center-side communication unit 310a transmits the storage request limitedly to the communication terminals 40 selected with the microcomputer 311a, among the communication terminals 40 included in the collection system 1. According to this configuration, it is possible to further narrow the storage devices 46 to hold the captured image. Accordingly, it is possible to suppress the waste of the capacity of the storage device 46.

As an example, it may be configured such that the microcomputer 311a selects communication terminals 40 in a fixed or smaller number of vehicles having a larger storage amount, based on the latest storage amount in the variable vehicle information obtained from the respective communication terminals 40 and stored in the data storage 32. The fixed number of vehicles here may be a number of vehicles corresponding to a part of the vehicles using the communication terminal 40 included in the collection system 1, and the number may be arbitrarily set. The fixed number may be similarly set in the following embodiments. According to this configuration, by limiting the vehicles based on storage amount of the storage device 46 so as to hold the captured image in vehicles having a sufficient storage amount, it is possible to prevent insufficiency of the capacity of the storage device 46.

As another example, it may be configured such that the microcomputer 311a selects communication terminals 40 in a fixed or smaller number of vehicles having a better communication environment, based on information on communication environment in the vehicle information obtained from the respective communication terminals 40 and stored in the data storage 32. According to this configuration, it is possible to suppress the waste of the capacity of the storage device 46 to hold captured images in a vehicle under a poor communication environment to perform transmission of the captured image from the communication terminal 40 to the data center 3.

As the information on communication environment in the vehicle information, the communication method(s), the telecommunications standard, and the communication resource in the fixed vehicle information, the latest traveling plan in the variable vehicle information, and the like, are given. For example, it may be configured such that the communication environment is better when the number of available communication methods is larger. Further, it may be configured such that the communication environment is better when the telecommunications standard is newer. Otherwise, it may be configured such that the communication environment is better when the available band is wider. Further, it may be configured such that the communication environment is better when the latest traveling plan has a route with suppressed occurrence of communication delay and/or loss. In this case, it may be configured such that the data center 3a obtains and uses a map on an area where the occurrence of communication delay and/or loss is suppressed.

As another example, it may be configured such that the microcomputer 311a selects communication terminals 40 in a fixed or smaller number of vehicles having a higher sensor configuration level, based on sensor configuration in the fixed vehicle information obtained from the respective communication terminals 40 and stored in the data storage 32. As an example, it may be configured such that the sensor configuration level is higher when the resolution and the frame rate are higher. According to this configuration, it is possible to collect higher-quality captured images with the data center 3a.

As another example, it may be configured such that the microcomputer 311a selects communication terminals 40 in a fixed or smaller number of vehicles utilizing plural services using captured images and utilizing higher-value services, based on available services in the fixed vehicle information obtained from the respective communication terminals 40 and stored in the data storage 32. As an example, as a higher-value service, a service allowable communication delay of which is more suppressed, is given. As a specific example, it may be configured such that communication terminals 40 in vehicles utilizing, in addition to a traveling abnormality detection service, a remote monitoring service, allowable communication delay of which is more suppressed than that of the traveling abnormality detection service, may be selected. According to this configuration, it is possible, by utilizing communication with suppressed communication delay used in higher-value service, to collect required captured images while reducing the communication delay.

As another example, it may be configured such that the microcomputer 311a selects communication terminals 40 in a fixed or smaller number of vehicles with a smaller number of available services, based on available services in the fixed vehicle information obtained from the respective communication terminals 40 and stored in the data storage 32. According to this configuration, it is possible to collect captured images by using more idle lines.

Note that it may be configured such that the data center 3a transmits a storage request to the communication terminals 40 in all the vehicles included in the collection system 1, without limiting the transmission destinations of the storage request, as long as the request is not to tighten the storage amount of the storage device 46 such as a request for storage of last ten minutes compressed images. On the other hand, it is preferable that the transmission destinations of the storage request are narrowed when the request is for storage of images captured for past one day or is for transmission of raw data having a large data amount.

Further, it may be configured such that in the fifth embodiment, the service center 2 and data center 3a do not transmit a transmission request to the communication terminal 40. In this case, it may be configured such that when communication is possible at a communication cost equal to or lower than the upper limit value of the communication cost designated with the cost designation request, the communication terminal 40 transmits the captured image stored in the storage device 46 to the data center 3a using the communication at the communication cost equal to or lower than the upper limit value. According to this configuration, it is possible to suppress the waste of the communication cost to transmit the captured image to the data center 3a while suppressing the waste of the capacity of the storage device 46 by narrowing the communication terminals 40 to store the captured image in the storage device 46 to communication terminals 40 which satisfy the predetermined condition. Note that the present disclosure is not limited to the configuration where the upper limit value of the communication cost is designated with the cost designation request. For example, it may be configured such that the upper limit value of the communication cost is designated, not with the cost designation request, but with a default upper limit value set by service.

Further, in the fifth embodiment, it may be configured such that the data center 3a does not transmit the cost designation request in addition to the transmission request to the communication terminal 40. In this case, the communication terminal 40 autonomously selects communication used for transmission of the captured image, and transmits the captured image stored in the storage device 46 to the data center 3a. Even in this case, it is possible, by narrowing the communication terminals 40 to store the captured image in the storage device 46 to communication terminals 40 which satisfy a predetermined condition, to narrow the communication terminals 40 to transmit the captured image to the data center 3a. Accordingly, in comparison with a case where the communication terminals 40 are not narrowed based on the predetermined condition, it is possible to suppress the waste of the communication cost for transmission of the captured image to the data center 3a.

Sixth Embodiment

In the above-described embodiment, the service center 2 and the data center 3 or 3a transmit a storage request, however, the present disclosure is not necessarily limited to this configuration. For example, it may be configured such that the service center 2 and the data center 3 or 3a do not transmit the storage request (hereinbelow, a sixth embodiment).

When the sixth embodiment is adopted, as an example, it may be configured such that in the communication terminal 40, the data acquisition unit 420 sequentially obtains a captured image from the periphery monitoring camera from turning ON to turning OFF of the ignition power source of a vehicle using the communication terminal 40, and the storage processor 401 stores the captured image in the storage device 46 for a fixed period.

Even in the configuration according to the sixth embodiment, the communication terminals 40 to transmit the object captured image to the data center 3 or 3a are narrowed to a part of communication terminals 40 in the plural object vehicles. In the object vehicle from which the object captured image has not been transmitted to the data center 3 or 3a, the object captured image stored in the storage device 46 is deleted. Accordingly, it is possible to suppress the waste of the communication cost upon collection of sensing information and the waste of the capacity of the storage device 46.

Seventh Embodiment

In the above-described embodiment, the data center 3 requires the communication terminal 40 to delete the object captured image, however, the present disclosure is not limited to this configuration. For example, it may be configured such that the deletion of the object captured image is required by inter-vehicle communication between the communication terminals used in the vehicles (hereinbelow, a seventh embodiment).

<Schematic Configuration of Collection System 1b>

Figure 9:
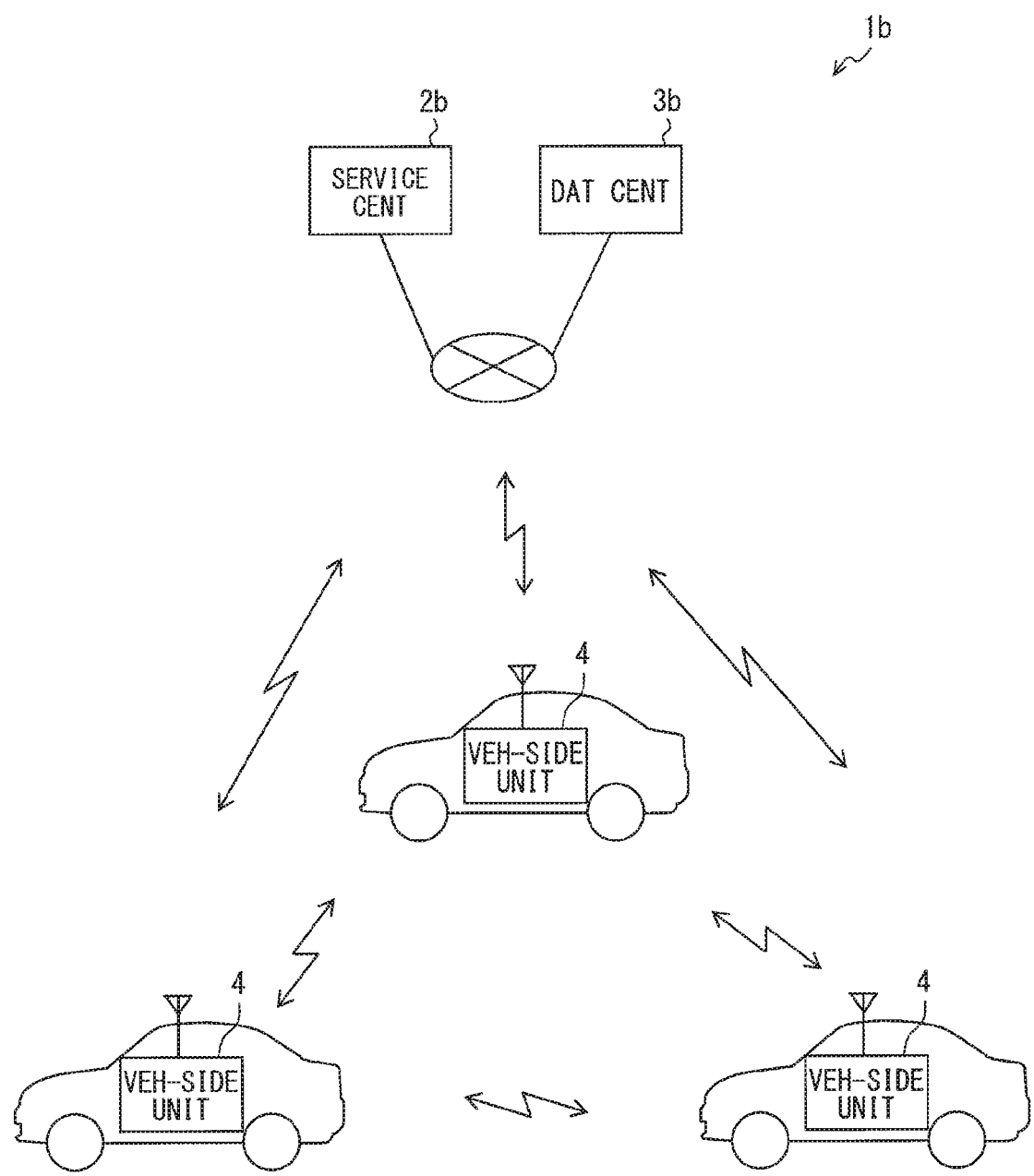
FIG. 9 is a diagram showing an example of a schematic configuration of a collection system 1b.

Hereinbelow, the configuration of the seventh embodiment will be described. As shown in FIG. 9, a collection system 1b according to the seventh embodiment has a service center 2b, a data center 3b, and a vehicle-side unit 4b used in the respective plural vehicles.

The service center 2b is the same as the service center 2 according to the first embodiment except that services performed in the present embodiment are different from those performed in the first embodiment. The service center 2b obtains the latest specific sensing information from the communication terminal 40b to be described later in the vehicle-side unit 4b via the data center 3b. Then the service center 2b performs services utilizing the obtained specific sensing information. As an example, the specific sensing information may be a measurement value detected with the LIDAR mounted in the vehicle, and the service may be a map service of generating a three-dimensional map from the measurement value detected with the LIDAR and providing the map. Hereinafter, the specific sensing information is a captured image obtained by image sensing with an invehicle camera. The service may be a remote monitoring service of obtaining the latest captured image and providing the captured image.

It may be configured such that the service center 2*b* transmits the above-described storage request and transmission request to the data center 3*b*, and the data center 3*b* transmits the storage request and the transmission request to the communication terminal 40*b*. However, in the following example of the seventh embodiment, the service center 2*b* does not transmit the storage request and the transmission request to the data center 3*b*.

Figure 10:
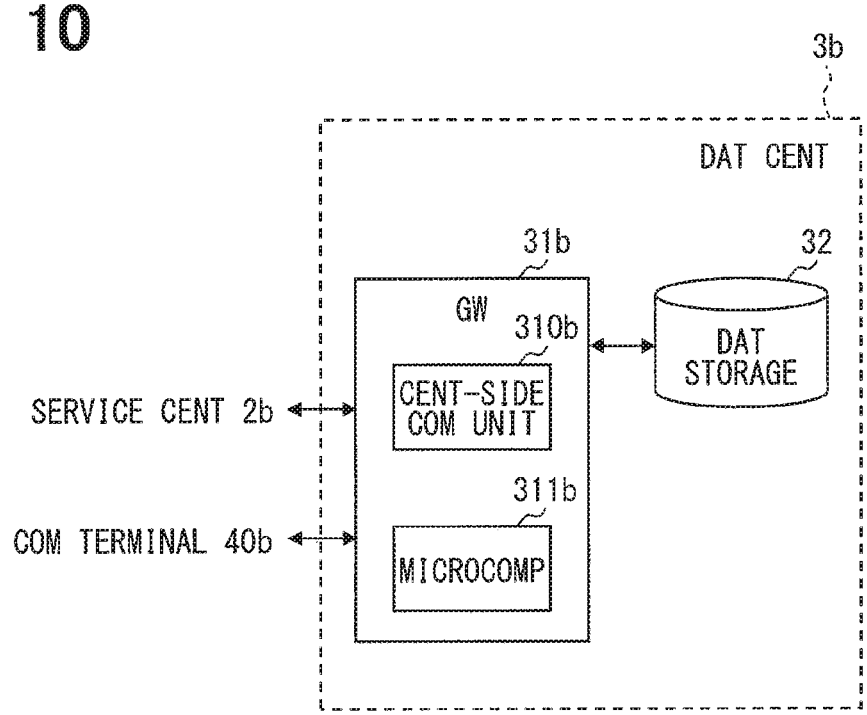
FIG. 10 is a diagram showing an example of a schematic configuration of a data center 3b.

The data center 3*b* is the same as the data center 3 according to the first embodiment. However, in the seventh embodiment, the data center 3*b* does not transmit the storage request and the transmission request. As shown in FIG. 10, the data center 3*b* has a GW 31*b* and the data storage 32. The data center 3*b* is the same as the data center 3 according to the first embodiment except that the data center 3*b* has the GW 31*b* in place of the GW 31. The GW 31*b* has a center-side communication unit 310*b* and a microcomputer 311*b*. The GW 31*b* receives the captured image transmitted from the communication terminal 40*b* with the center-side communication unit 310*b*, and stores the captured image in the data storage 32. Then, the center-side communication unit 310*b* transmits the captured image stored in the data storage 32 to the service center 2*b*. The microcomputer 311*b* performs various processing related to communication control in the data center 3*b*. The data center 3*b* also corresponds to the center.

The vehicle-side unit 4*b* which performs communication with the data center 3*b*, further performs communication with the vehicle-side unit 4*b* used in another vehicle without server. That is, the vehicle-side unit 4*b* performs inter-vehicle communication. The vehicle-side unit 4*b* is the same as the vehicle-side unit 4 according to the first embodiment except that the vehicle-side unit 4*b* has a communication terminal 40*b* in place of the communication terminal 40.

<Schematic Configuration of Communication Terminal 40*b*>

Figure 11:
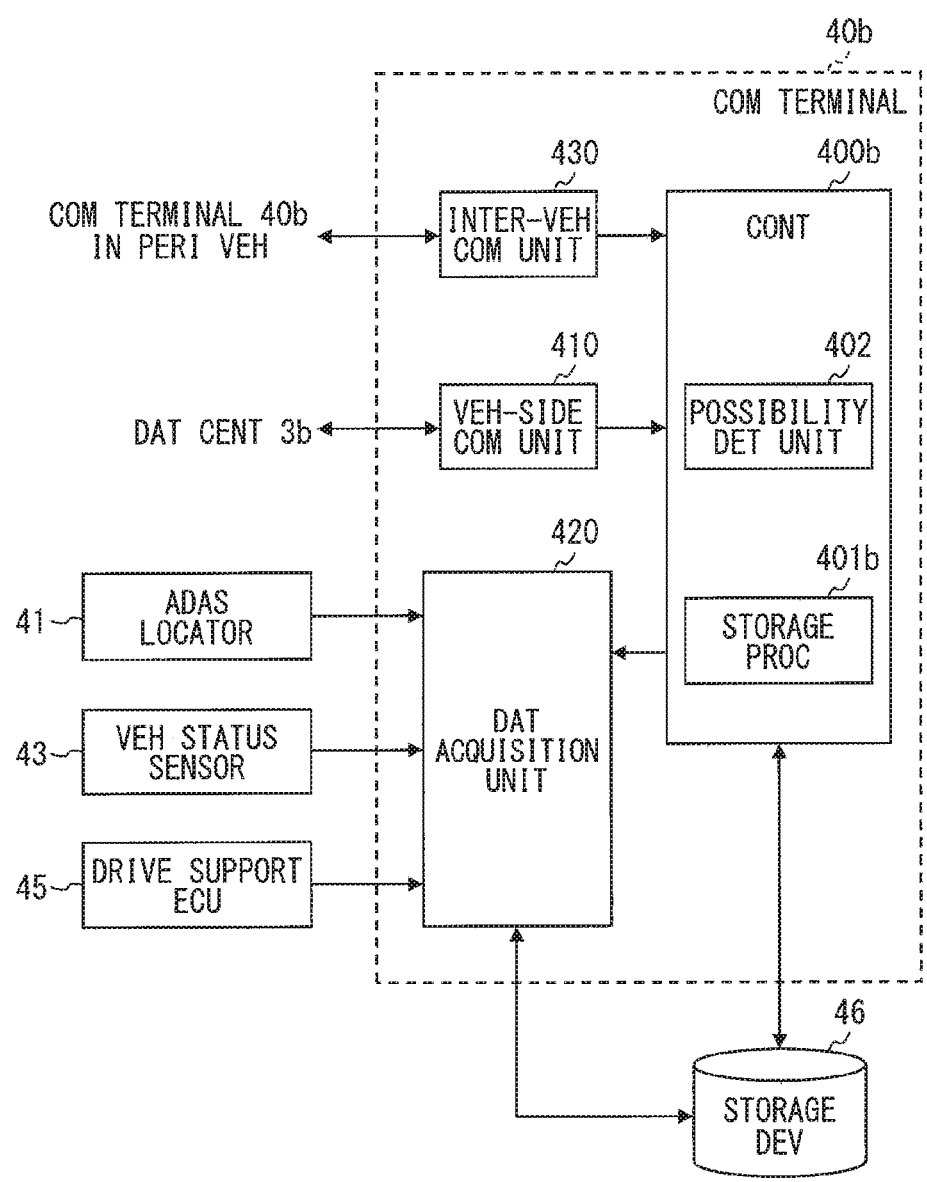
FIG. 11 is a diagram showing an example of a schematic configuration of a communication terminal 40b.

Next, using FIG. 11, a schematic configuration of the communication terminal 40*b* will be described. As shown in FIG. 11, the communication terminal 40*b* has a controller 400*b*, the vehicle-side communication unit 410, the data acquisition unit 420, and an inter-vehicle communication unit 430. Further, the controller 400 has a storage processor 401*b* and a possibility determination unit 402.

The inter-vehicle communication unit 430 performs inter-vehicle communication without server with the inter-vehicle communication unit 430 of the communication terminal 40*b* used in another vehicle. The frequency band used for the inter-vehicle communication is e.g. 760 MHz. Further, another frequency band such as 2.4 GHz or 5.9 GHz may be used. Further, it is preferable that the inter-vehicle communication is direct communication so as to more easily limit communication range to the periphery of the own vehicle. However, the inter-vehicle communication may be indirect communication using a multi-hop method. When the multi-hop indirect communication is adopted, to limit the communication range to the periphery of the own vehicle, for example, the number of times of multi-hop transfer may be limited.

The controller 400*b* may be the same as the controller 400 according to the first embodiment except that the controller 400*b* performs processing related to the inter-vehicle communication unit 430. The storage processor 401*b* of the controller 400*b* causes the data acquisition unit 420 to sequentially obtain a captured image obtained with the periphery monitoring camera and sequentially store the captured image in the storage device 46. The period of storage of the captured image in the storage device 46 is limited to a fixed period not to tighten the storage amount.

Further, the controller 400*b* sequentially transmits the captured image stored in the storage device 46 from the vehicle-side communication unit 410 to the data center 3*b*. That is, the controller 400*b* sequentially transmits the latest captured image (hereinbelow, object captured image) from the vehicle-side communication unit 410 to the data center 3*b*. In this case, to suppress the waste of the communication cost, it is preferable that the controller 400*b* transmits the captured image to the data center 3*b* using communication at a lower communication cost among communications available for the vehicle-side communication unit 410. The latest captured image transmitted from the vehicle-side communication unit 410 corresponds to the specific sensing information corresponding to a current time point. The storage processor 401 deletes the captured image, the transmission to the data center 3*b* of which has been completed, from the storage device 46 in the own vehicle.

Further, when the object captured image is transmitted from the vehicle-side communication unit 410 to the data center 3*b*, the possibility determination unit 402 of the controller 400*b* determines whether or not the possibility of completion of the transmission of the object captured image from the vehicle-side communication unit 410 is high. As an example, the determination may be made based on the vehicle information such as the variable vehicle information or the fixed vehicle information of the own terminal stored in the storage device 46. More specifically, the determination may be made based on the communication method, the telecommunications standard, and the communication resource in the fixed vehicle information, the latest traveling plan in the variable vehicle information, and the like.

For example, the possibility may be highly estimated when the number of available communication methods is larger. Further, the possibility may be highly estimated when the telecommunications standard is newer, or may be highly estimated when the available band is wider. Further, the possibility may be highly estimated based on passage on a route with more suppressed communication delay and/or loss in the latest traveling plan. In this case, it may be configured such that the communication terminal 40*b* obtains and uses a map on an area where the occurrence of communication delay and/or loss is suppressed. The possibility determination unit 402 may determine as to whether or not the possibility of completion of the transmission of the object captured image is high by using one of these pieces of vehicle information, or by using integrated plural pieces of information.

Then, when the possibility determination unit 402 determines that the possibility of completion of the transmission of the object captured image from the vehicle-side communication unit 410 is high, the controller 400*b* causes the inter-vehicle communication unit 430 to transmit a notification not to perform transmission of the object captured image to the data center 3*b* (hereinbelow, transmission stop notification) to the communication terminal 40*b* in peripheral vehicles communicable by the inter-vehicle communication. In the communication terminal 40*b* in the peripheral vehicle where the transmission stop notification has been received with the inter-vehicle communication unit 430, the controller 400*b* stops the transmission of the object captured image from the vehicle-side communication unit 410.

When the transmission of the object captured image from the vehicle-side communication unit 410 has not been completed although the transmission stop notification was transmitted from the inter-vehicle communication unit 430, the controller 400b transmits a notification to restart the transmission of the object captured image to the data center 3b (hereinbelow, release notification). In the communication terminal 40b in the peripheral vehicle where the release notification has been received with the inter-vehicle communication unit 430, the controller 400b restarts the transmission of the object captured image from the vehicle-side communication unit 410.

Further, when the transmission of the object captured image from the vehicle-side communication unit 410 has been completed, the controller 400b causes the inter-vehicle communication unit 430 to transmit a notification to delete the object captured image stored in the storage device 46 (hereinbelow, deletion notification) to the communication terminal 40b in the peripheral vehicles communicable by the inter-vehicle communication. The deletion notification may be the above-described deletion instruction. Further, the deletion notification may be a notification to notify the completion of the transmission of the object captured image. In the communication terminal 40b in the peripheral vehicle where the deletion notification has been received with the inter-vehicle communication unit 430, the controller 400b stops the transmission of the object captured image from the vehicle-side communication unit 410, and the storage processor 401b deletes the object captured image stored in the storage device 46.

Note that in the seventh embodiment, it may be configured such that the controller 400b does not transmit the variable vehicle information and the fixed vehicle information from the vehicle-side communication unit 410 to the data center 3b.

<Collection-Related Processing in Communication Terminal 40b>

Figure 12:
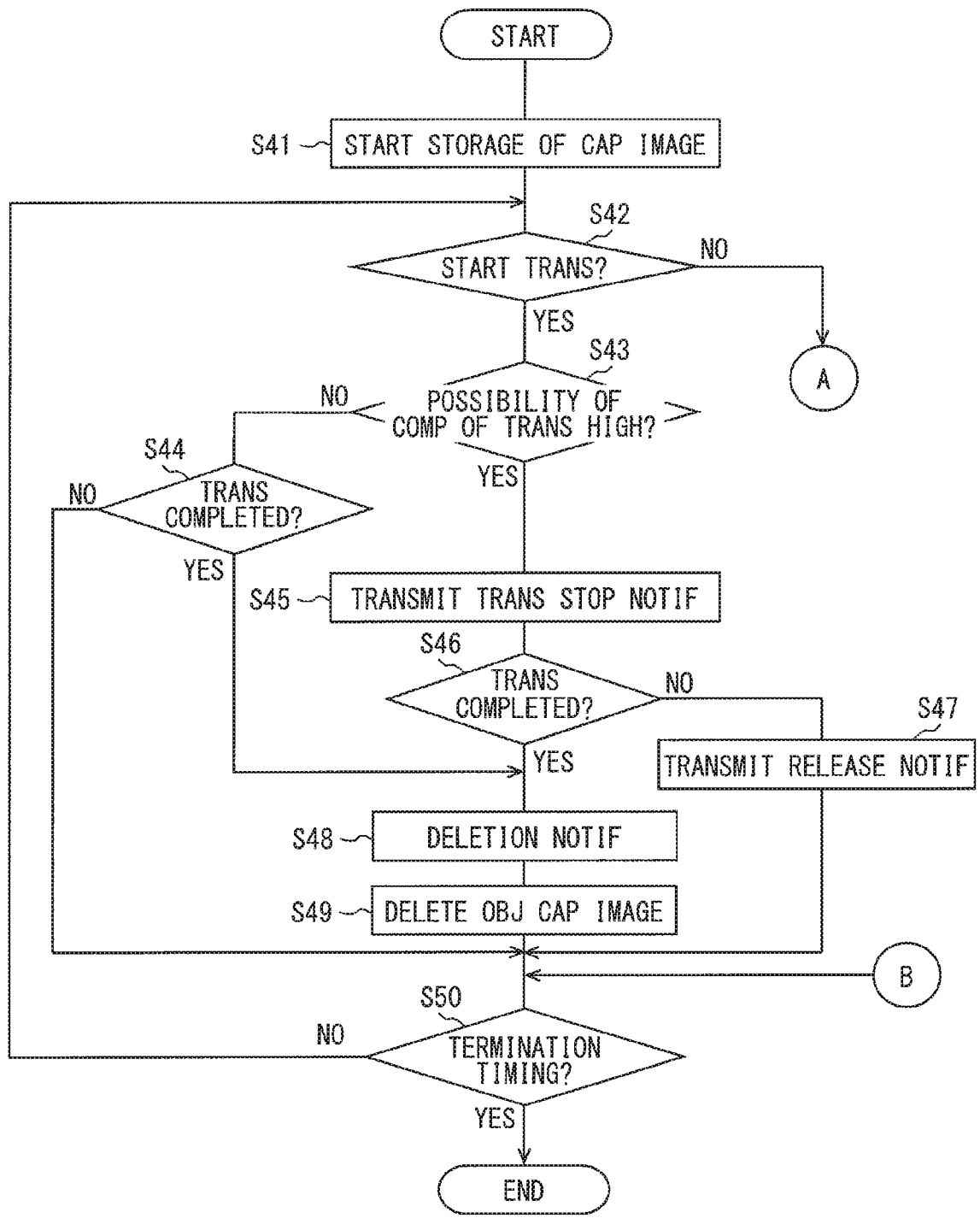
FIG. 12 is a flowchart showing an example of the flow of collection-related processing in the communication terminal 40b.
Figure 13:
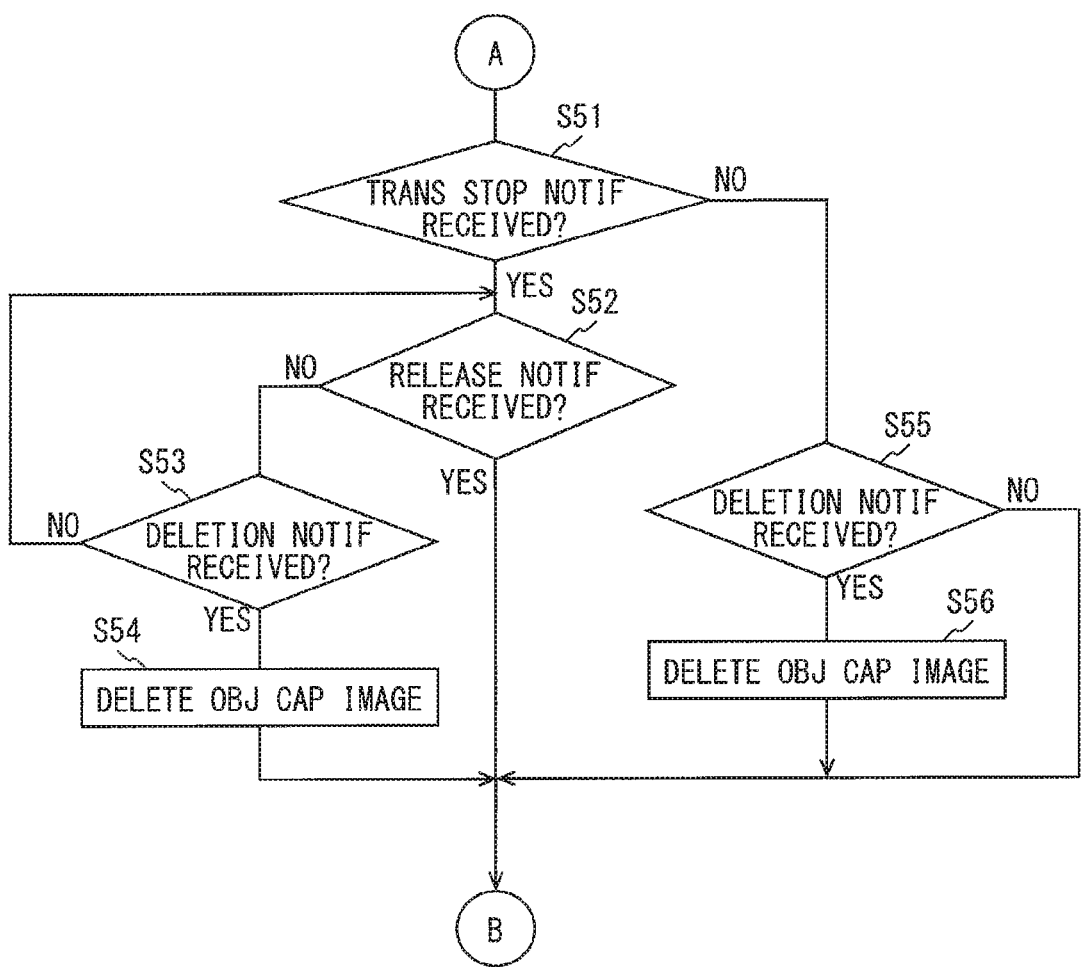
FIG. 13 is a flowchart showing an example of the flow of collection-related processing in the communication terminal 40b.

Next, using the flowcharts of FIGS. 12 and 13, an example of the flow of the collection-related processing related to the collection of object captured images in the communication terminal 40b will be described. It may be configured such that the flowchart of FIG. 12 is started when the ignition power source of the own vehicle is turned ON.

First, at step S41, the storage processor 401b starts storage of the captured image from the periphery monitoring camera, sequentially obtained with the data acquisition unit 420, in the storage device 46. At step S42, when the vehicle-side communication unit 410 starts transmission of the object captured image stored in the storage device 46 (YES at S42), the process proceeds to step S43. On the other hand, when the transmission of the object captured images is not started (NO at S42), the process proceeds to step S51. It may be configured such that when the object captured image is transmitted to the data center 3b utilizing e.g. Wi-Fi, the transmission of the object captured image is performed upon each entrance in a Wi-Fi access spot. Further, when the object captured image is transmitted to the data center 3b utilizing e.g. LTE, the transmission may be performed periodically.

At step S43, the possibility determination unit 402 determines whether or not the possibility of completion of the transmission of the object captured image from the vehicle-side communication unit 410 is high. Then, when the possibility determination unit 402 determines that the possibility is high (YES at S43), the process proceeds to step S45. On the other hand, when the possibility determination unit 402 determines that the possibility is low (NO at S43), the process proceeds to step S44. At step S44, when the transmission of the object captured image from the vehicle-side communication unit 410 is completed (YES at S44), the process proceeds to step S48. On the other hand, when the transmission of the object captured images from the vehicle-side communication unit 410 is not completed (NO at S44), the process proceeds to step S50.

At step S45, the controller 400b transmits the transmission stop notification from the inter-vehicle communication unit 430 to the communication terminal 40b in the peripheral vehicles communicable by the inter-vehicle communication. At step S46, when the transmission of the object captured image from the vehicle-side communication unit 410 is completed (YES at S46), the process proceeds to step S48. On the other hand, the transmission of the object captured images from the vehicle-side communication unit 410 is not completed (NO at S46), the process proceeds to step S47. At step S47, the controller 400b transmits the release notification from the inter-vehicle communication unit 430 to the communication terminal 40b in the peripheral vehicles communicable by the inter-vehicle communication.

At step S48, the controller 400b transmits the deletion notification from the inter-vehicle communication unit 430 to the communication terminal 40b in the peripheral vehicles communicable by the inter-vehicle communication. At step S49, the storage processor 401b deletes the object captured image stored in the storage device 46 in the own vehicle. At step S50, when it is determined that it is the timing of termination of the collection-related processing in the communication terminal 40b (YES at S50), the collection-related processing in the communication terminal 40b is terminated. On the other hand, when it is determined that it is not the termination timing (NO at S50), the process returns to step S42 to repeat the processing. As an example of the termination timing of the collection-related processing in the communication terminal 40b, turning-OFF of the ignition power source of the own vehicle or the like is given.

At step S51 performed when the transmission of the object captured images is not started at step S42, when the transmission stop notification is received with the inter-vehicle communication unit 430 (YES at S51), the process proceeds to step S52. On the other hand, when the transmission stop notification is not received with the inter-vehicle communication unit 430 (NO at S51), the process proceeds to step S55.

At step S52, when the inter-vehicle communication unit 430 receives the release notification (YES at S52), the process proceeds to step S50. On the other hand, when the inter-vehicle communication unit 430 does not receive the release notification (NO at S52), the process proceeds to step S53. At step S53, when the inter-vehicle communication unit 430 receives the deletion notification (YES at S53), the process proceeds to step S54. On the other hand, when the inter-vehicle communication unit 430 does not receive the deletion notification (NO at S53), the process returns to step S52 to repeat the processing. When the inter-vehicle communication unit 430 receives the transmission stop notification, the controller 400b does not transmit the object captured image from the vehicle-side communication unit 410 to the data center 3b until the release notification is received. At step S54, the storage processor 401b deletes the object captured image stored in the storage device 46 in the own vehicle, and the process proceeds to step S50.

At step S55, when the inter-vehicle communication unit 430 receives the deletion notification (YES at S55), the process proceeds to step S56. On the other hand, when the inter-vehicle communication unit 430 does not receive the deletion notification (NO at S55), the process proceeds to step S50. At step S56, the storage processor 401b deletes the object captured image stored in the storage device 46 in the own vehicle, and the process proceeds to step S50.

<Collection-Related Processing in Collection System 1*b*>

Figure 14:
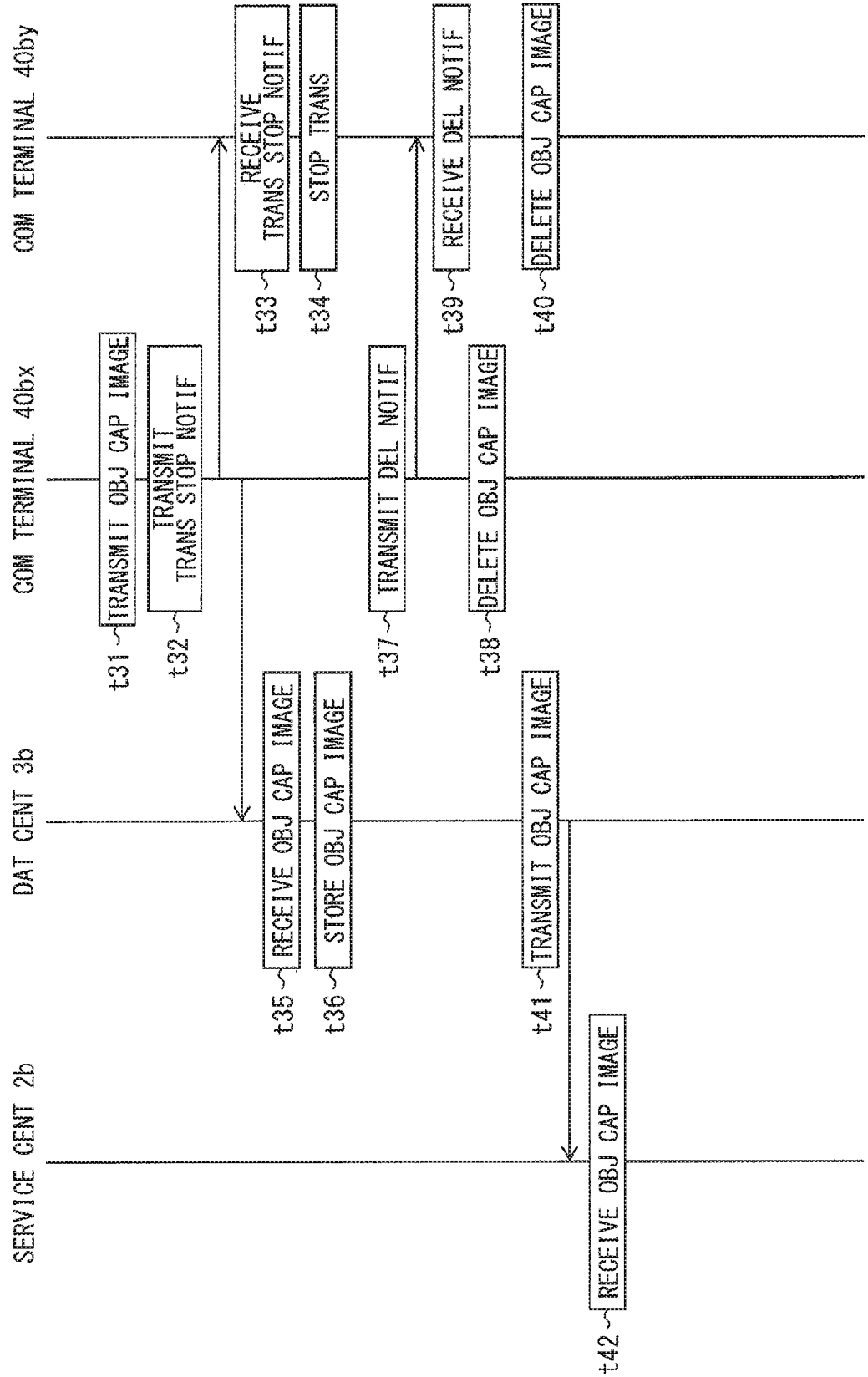
FIG. 14 is a sequence chart showing an example of the flow of collection-related processing in the collection system 1b according to a seventh embodiment of the present disclosure.

Next, using the sequence chart of FIG. 14, an example of the flow of the collection-related processing in the collection system 1*b* according to the seventh embodiment will be described. In the sequence chart of FIG. 14, in the communication terminals 40*b* in two object vehicles communicable by the inter-vehicle communication, the communication terminal 40*b* which has first transmitted the object captured image will be referred to as "a communication terminal 40*bx*". The other communication terminal 40*b* will be referred to as a "communication terminal 40*by*". Further, in the following example in FIG. 14, the possibility determination unit 402 of the communication terminal 40*bx* determines that the possibility of completion of the transmission of the object captured image from the vehicle-side communication unit 410 is high.

First, in the communication terminal 40*bx*, the vehicle-side communication unit 410 starts transmission of the object captured image stored in the storage device 46 to the data center 3 (t31). Further, in the communication terminal 40*bx*, the possibility determination unit 402 determines that the possibility of completion of the transmission of the object captured images from the vehicle-side communication unit 410 is high. The controller 400*b* transmits the transmission stop notification from the inter-vehicle communication unit 430 to the communication terminal 40*by* in the peripheral vehicle communicable by the inter-vehicle communication (t32).

In the communication terminal 40*by*, the inter-vehicle communication unit 430 receives the transmission stop notification transmitted from the communication terminal 40*bx* by the inter-vehicle communication (t33). In the communication terminal 40*by* which has received the transmission stop notification, the controller 400*b* does not transmit the object captured image from the vehicle-side communication unit 410 to the data center 3*b* (t34).

The data center 3*b* receives the object captured image transmitted from the communication terminal 40*bx* (t35), and stores the received object captured image in the data storage 32 (t36). In the communication terminal 40*bx* in which the transmission of the object captured image from the vehicle-side communication unit 410 has been completed, the inter-vehicle communication unit 430 transmits a deletion notification to the communication terminal 40*by* in the peripheral vehicle communicable by the inter-vehicle communication (t37). Further, in the communication terminal 40*bx*, the storage processor 401*b* deletes the object captured image stored in the storage device 46 in the own vehicle (t38).

In the communication terminal 40*by*, the inter-vehicle communication unit 430 receives the deletion notification transmitted from the communication terminal 40*bx* by the inter-vehicle communication (t39). In the communication terminal 40*by* which has received the deletion notification, the storage processor 401*b* deletes the object captured image stored in the storage device 46 in the own vehicle (t40).

Further, the data center 3*b* which has stored the object captured image in the data storage 32 transmits the stored object captured image from the center-side communication unit 310 to the service center 2*b* (t41). The service center 2*b* receives the object captured image transmitted from the data center 3*b*, thus obtains the object captured image (t42).

Generalization of Seventh Embodiment

According to the seventh embodiment, when the transmission of the latest object captured image as the specific sensing information corresponding to the current time point, stored in the storage device 46, from the vehicle-side communication unit 410 to the data center 3*b* is completed, the inter-vehicle communication unit 430 transmits a deletion notification to the peripheral communication terminal 40*b* communicable with the own terminal by the inter-vehicle communication. As the peripheral communication terminal communicable with the own terminal by the inter-vehicle communication is the communication terminal 40*b* used in the peripheral vehicle in a traveling position approximate to that of the vehicle using the own terminal at the current time point. Accordingly, there is a high possibility that an approximate object captured image as the latest object captured image is stored in the storage device 46. When the transmission of the object captured image from the vehicle-side communication unit is completed, the inter-vehicle communication unit 430 transmits the deletion notification to the peripheral communication terminal 40*b* communicable with the own terminal by the inter-vehicle communication. Accordingly, it is possible to prevent storage of the approximate object captured image in the storage device 46 in all the peripheral vehicles around the vehicle using the own terminal.

Further, when the transmission of the object captured image from the vehicle-side communication unit 410 is completed, the inter-vehicle communication unit 430 transmits the deletion notification to the peripheral communication terminal 40*b* communicable with the own terminal by the inter-vehicle communication. Accordingly, it is possible to suppress the waste of the communication cost by further transmitting the object captured image, approximate to the already-obtained object captured image, to the data center 3*b* which has already obtained the image. As a result, it is possible to suppress the waste of the communication cost upon collection of sensing information and suppress the waste of the capacity of the storage device 46.

Note that in the seventh embodiment, it may be configured such that the communication terminal 40*b* does not have the possibility determination unit 402, and the determination as to whether or not the possibility of completion of the transmission of the object captured image from the vehicle-side communication unit 410 is high is not made. In this case, the processing at steps S43 to S45 in the flowchart of FIG. 12, the processing at steps S51 to S54 in the flowchart of FIG. 13, and the processing at time points t32 to t34 in the sequence chart of FIG. 14, may be omitted.

Eighth Embodiment

In the seventh embodiment, the service center 2*b* and the data center 3*b* do not transmit the storage request and the transmission request, however, the present disclosure is not necessarily limited to this configuration. For example, it may be configured such that the service center 2*b* and the data center 3*b* transmit the storage request and/or the transmission request.

When it is configured such that the service center 2*b* and the data center 3*b* transmit the storage request, as in the case of the fifth embodiment, it may be configured such that the communication terminals 40*b* to which the storage request is transmitted from the data center 3*b* are narrowed to communication terminals 40*b* which satisfy a predetermined condition, or as in the case of the first embodiment, the communication terminals 40*b* are not narrowed to communication terminals 40*b* which satisfy the predetermined condition.

Further, it may be configured such that when it is configured such that the service center 2*b* and the data center 3*b* transmit the transmission request, the communication terminals 40*b* to which the transmission request is transmitted from the data center 3*b* are narrowed to communication terminals 40*b* which satisfy a predetermined condition. The predetermined condition here may be the same as the condition for narrowing the transmission destinations of the storage request in the fifth embodiment.

Ninth Embodiment

Further, it may be configured such that when the communication terminals 40*b* to which the transmission request is transmitted from the data center 3*b* are narrowed to communication terminals 40*b* which satisfy a predetermined condition, in the communication terminal 40*b* which has received the transmission request, it is determined whether or not transmission of the object captured image from the own terminal is suitable. When it is determined that the transmission is not suitable, the transmission request is transferred to the peripheral communication terminal 40*b* (hereinbelow, a ninth embodiment).

It may be configured such that the determination as to whether or not the transmission of the object captured image from the own terminal is suitable is made with the controller 400*b* of the communication terminal 40*b*. Accordingly, the controller 400*b* corresponds to a suitability determination unit. For example, it may be configured such that the controller 400*b* determines whether or not the transmission of the object captured image from the own terminal is suitable based on whether or not the possibility of completion of the transmission of the object captured image from the vehicle-side communication unit 410 of the own terminal is high. It may be configured such that the determination as to whether or not the possibility of completion of the transmission of the object captured image from the vehicle-side communication unit 410 of the own terminal is high is made as in the case of the processing in the possibility determination unit 402 described in the seventh embodiment.

Next, using the sequence chart of FIG. 15, an example of the flow of the transmission of the transmission request from the data center 3*b* to the communication terminal 40*b* in the collection system 1*b* according to the ninth embodiment will be described. In the sequence chart of FIG. 15, in the communication terminals 40*b* in two object vehicles communicable by the inter-vehicle communication, the communication terminal which receives the transmission request from the data center 3*b* will be referred to as a communication terminal 40*bx*, and the other communication terminal, as a communication terminal 40*by*. Further, in the example in FIG. 15, it is determined that the transmission of the object captured image from the own terminal is not suitable in the controller 400*b* of the communication terminal 40*bx*.

First, the service center 2*b* transmits the transmission request to the data center 3*b* (t61). The data center 3*b* receives the transmission request transmitted from the service center 2*b* with the center-side communication unit 310*b* (t62). The data center 3*b* selects the communication terminal 40*bx* which satisfies a predetermined condition, from the communication terminals 40*bx* and 40*by* in the object vehicles. The data center 3*b* transmits the transmission request from the center-side communication unit 310*b* to the communication terminal 40*bx* in the object vehicle (t63). The communication terminal 40*bx* receives the transmission request transmitted from the data center 3*b* with the vehicle-side communication unit 410 (t64).

In the communication terminal 40*bx* which has received the transmission request, the controller 400*b* determines whether or not the transmission of the object captured image from the own terminal is suitable, and determines that the transmission is not suitable (t65). In the communication terminal 40*bx* where it is determined that the transmission is not suitable, the inter-vehicle communication unit 430 transfers the received transmission request to the communication terminal 40*by* in the peripheral vehicle communicable by the inter-vehicle communication (t66).

The communication terminal 40*by* receives the transmission request transferred from the communication terminal 40*bx* with the inter-vehicle communication unit 430 (t67). In the communication terminal 40*by*, the controller 400*b* determines whether or not the transmission of the object captured image from the own terminal is suitable. When the controller 400*b* determines that the transmission is suitable, the vehicle-side communication unit 410 starts transmission of the object captured image stored in the storage device 46 to the data center 3*b*. On the other hand, when the controller 400*b* determines that the transmission is not suitable, the received transmission request is further transferred.

According to the configuration of the ninth embodiment, as the communication terminals 40*b* to which the transmission request is transmitted from the data center 3*b* are narrowed to communication terminals 40*b* which satisfy a predetermined condition, it is possible to narrow the communication terminals 40*b* to transmit the object captured image to the data center 3*b*. Accordingly, it is possible to suppress the waste of the communication cost upon collection of object captured images with the data center 3*b* from the communication terminals 40*b*. Further, in the narrowed communication terminal 40*b*, when it is determined that the transmission of the object captured images is not suitable, the transmission request is transferred to the peripheral communication terminal 40*b*. Thus it is possible to transmit the object captured image from the communication terminal 40*b* more suitable to the transmission of the object captured image. Accordingly, it is possible to suppress the waste of the communication cost in transmission of the object captured image from the communication terminal 40*b* not suitable to transmit the object captured image while more infallibly performing the transmission of the object captured image to the data center 3*b*. It may be configured such that upon transfer of the transmission request, the object captured image is also transferred, so as to transfer the transmission request to the communication terminal 40*b* which does not satisfy the predetermined condition but which is more suitable for the transmission of the object captured image. Further, it may be configured such that the transmission request is transferred to the communication terminal 40*b* to which the object captured image was transferred in the past.

Tenth Embodiment

In the above-described embodiments, the service center 2 or 2*b* obtains specific sensing information via the data center 3, 3*a* or 3*b* from the communication terminal 40 or 40*b*, however, the present disclosure is not limited to this configuration. It may be configured such that the service center 2 or 2*b* also has the function of the data center 3, 3*a* or 3*b* to obtain the specific sensing information from the communication terminal 40 or 40*b*, and the service center 2 or 2*b* obtains the specific sensing information without data center 3, 3a or 3b from the communication terminal 40 or 40b. In this case, the service center 2 or 2b corresponds to the center.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data collection system comprising:
a communication terminal in each of a plurality of vehicles; and
a data center that communicates with each communication terminal, wherein:
each communication terminal includes:
a storage processor that stores specific sensing information, which is sequentially obtained from a sensor of a respective vehicle to which the communication terminal is mounted, in a storage device of the respective vehicle for a predetermined time period; and
a vehicle-side communication unit that communicates, using a vehicle-side processor, with the data center;
the data center includes:
a data center-side communication unit that communicates, using a data center-side processor, with each communication terminal; and
a data center-side storage that stores information;
the vehicle-side communication unit sequentially transmits vehicle information, which includes a vehicle position of the respective vehicle and is different from the specific sensing information, to the data center;
the data center-side communication unit transmits a transmission request for requesting to transmit object information, which is the specific sensing information corresponding to a specific time point, to the communication terminal mounted in an object vehicle, which is one of the plurality of vehicles disposed approximately at a traveling position at the specific time point;
the traveling position at the specific time point is specified based on the vehicle position in the vehicle information;
the vehicle-side communication unit transmits the object information stored in the storage device to the data center in response to the communication terminal receiving the transmission request;
in response to the data center-side communication unit receiving the object information transmitted from the communication terminal in a number of object vehicles, and the data center-side storage storing the object information, the data center-side communication unit in the data center transmits a deletion request for requesting to delete the object information stored in the storage device to the communication terminal in remaining object vehicles; and the storage processor in the remaining object vehicles deletes the object information stored in the storage device in response to the communication terminal receiving the deletion request.

2. The data collection system according to claim 1, wherein:
the vehicle-side communication unit transmits the specific sensing information using communication with a communication cost equal to or lower than an upper limit of a designated communication cost; and
in response to the data center-side storage having already stored the specific sensing information corresponding to the object information transmitted from the communication terminal in the number of object vehicles, the data center-side communication unit in the data center does not transmit the transmission request, but transmits the deletion request for requesting to delete the object information stored in the storage device, to the communication terminal in the remaining object vehicles;
in response to the data center-side storage having not stored the specific sensing information corresponding to the object information transmitted from the communication terminal in the number of object vehicles, the data center-side communication unit transmits the transmission request.

3. The data collection system according to claim 1, wherein:
the data center-side communication unit transmits a storage request for requesting to store the specific sensing information to the communication terminal before transmitting the transmission request;
the vehicle-side communication unit sequentially transmits the vehicle information including at least one of a status of the communication terminal and a status of the vehicle to which the communication terminal is mounted, to the data center;
in response to the vehicle-side communication unit of the communication terminal receiving the storage request, the storage processor stores the specific sensing information sequentially obtained from the sensor in the storage device for the predetermined time period; and
the data center-side communication unit restricts a transmission destination of the storage request to the communication terminal which satisfies a predetermined condition specified based on the vehicle information.

4. The data collection system according to claim 1, wherein:
the vehicle-side communication unit sequentially transmits the vehicle information, which includes the vehicle position of the respective vehicle to which the communication terminal is mounted and a sensor configuration of the respective vehicle, to the data center; and
the data center-side communication unit transmits the transmission request to the communication terminal mounted in the object vehicle, which is disposed approximately at the traveling position at the specific time point and has the sensor approximate to the sensor configuration to obtain the specific sensing information, the traveling position and the sensor configuration being specified based on the vehicle position and the sensor configuration in the vehicle information.

5. A data collection system comprising:
a communication terminal in each of a plurality of vehicles; and a data center that communicates with each communication terminal, wherein:
each communication terminal includes:
  a storage processor that stores specific sensing information, which is sequentially obtained from a sensor of a respective vehicle to which the communication terminal is mounted, in a storage device of the respective vehicle for a predetermined time period; and
  a vehicle-side communication unit that communicates, using a vehicle-side processor, with the data center;
the data center includes a data center-side communication unit that communicates, using a data center-side processor, with each communication terminal;
the vehicle-side communication unit sequentially transmits vehicle information, which includes at least one of a status of the communication terminal and a status of the vehicle to which the communication terminal is mounted, to the data center;
the vehicle information is different from the specific sensing information;
the data center-side communication unit transmits a storage request for requesting to store the specific sensing information to at least one communication terminal of the plurality of vehicles;
in response to the vehicle-side communication unit of at least one communication terminal receiving the storage request, the storage processor stores the specific sensing information sequentially obtained from the sensor in the storage device for the predetermined time period;
the data center-side communication unit restricts a transmission destination of the storage request to a communication terminal of at least one of the plurality of vehicles that satisfies a predetermined condition specified based on the vehicle information;
the vehicle-side communication unit transmits the specific sensing information stored in the storage device to the data center; and
a communication terminal of at least one of the plurality of vehicles that does not satisfy the predetermined condition does not store the specific sensing information.

6. A data collection system comprising:
a communication terminal in each of a plurality of vehicles; and
a data center that communicates with each communication terminal, wherein:
the data center includes a data center-side communication unit that communicates, using a data center-side processor, with the communication terminal;
each communication terminal includes:
  a storage processor that stores specific sensing information, which is sequentially obtained from a sensor of a respective vehicle to which the communication terminal is mounted, in a storage device of the respective vehicle for a predetermined time period;
  a vehicle-side communication unit that communicates using a vehicle-side processor, with the data center; and
  an inter-vehicle communication unit that communicates using the vehicle-side processor, with another communication terminal other than the communication terminal;
the vehicle-side communication unit transmits object information, which is the specific sensing information corresponding to a current time point and stored in the storage device, to the data center; and
in response to the vehicle-side communication unit completing transmission of the object information, the inter-vehicle communication unit transmits a notification, for requesting to stop transmission of the object information to the data center and to delete the object information in the storage device of a peripheral communication terminal, to the peripheral communication terminal communicable with the communication terminal.

7. The data collection system according to claim 6, wherein:
in response to the vehicle-side communication unit completes transmission of the object information, the inter-vehicle communication unit transmits the notification, for requesting to delete the object information stored in the storage device, to the peripheral communication terminal communicable with the communication terminal.

8. The data collection system according to claim 6, further comprising:
a possibility determination unit that determines using the vehicle-side processor, whether a possibility of completion of transmitting the object information from the vehicle-side communication unit is higher than a predetermined possibility, wherein:
in response to the possibility determination unit determines that the possibility of completion of transmitting the object information from the vehicle-side communication unit is higher than the predetermined possibility, the inter-vehicle communication unit transmits the notification for requesting not to transmit the object information to the data center, to the peripheral communication terminal communicable with the own terminal, before completing to transmit the object information from the vehicle-side communication unit; and
in response to the vehicle-side communication unit not completing transmission of the object information, the inter-vehicle communication unit transmits the notification, for requesting to restart a transmission of the object information to the data center, to the peripheral communication terminal.

9. The data collection system according to claim 6, wherein:
the vehicle-side communication unit sequentially transmits vehicle information, which includes at least one of a status of the communication terminal and a status of the vehicle to which the communication terminal is mounted, to the data center;
the data center-side communication unit transmits a transmission request, for requesting to transmit the object information, to the communication terminal that satisfies a predetermined condition specified based on the vehicle information;
the communication terminal further includes a suitability determination unit that determines whether a transmission of the object information from the communication terminal is suitable; and
in response to the suitability determination unit determining that the transmission of the object information from the communication terminal is suitable, the vehicle-side communication unit in the communication terminal, which receives the transmission request, transmits the object information stored in the storage device to the data center; and
in response to the suitability determination unit determining that the transmission of the object information from the communication terminal is not suitable, the inter-vehicle communication unit transfers the transmission request to the peripheral communication terminal communicable with the communication terminal.

10. A data center for communicating with a communication terminal that: is disposed in each of a plurality of vehicles; sequentially transmits vehicle information including a vehicle position of the vehicle to which the communication terminal is mounted; sequentially obtains specific sensing information from a sensor of a respective vehicle; and stores the specific sensing information in a storage device in the respective vehicle for a predetermined period, the data center comprising:

a data center-side communication unit that communicates, using a data center-side processor, with each communication terminal; and a data center-side storage that stores information, wherein:

the data center-side communication unit transmits a transmission request for requesting to transmit object information, which is the specific sensing information corresponding to a specific time point, to the communication terminal mounted in an object vehicle, which is one of the plurality of vehicles disposed approximately at a traveling position at the specific time point;

the traveling position at the specific time point is specified based on the vehicle position in the vehicle information sequentially transmitted from the communication terminal; and in response to the data center-side communication unit receiving the object information transmitted from the communication terminal in a number of object vehicles, and the data center-side storage storing the object information, the data center-side communication unit transmits a deletion request for requesting to delete the object information stored in the storage device to the communication terminal in remaining object vehicles.

* * * * *